(12) United States Patent
Xie et al.

(10) Patent No.: US 11,075,974 B2
(45) Date of Patent: *Jul. 27, 2021

(54) VIDEO DATA PROCESSING METHOD AND APPARATUS

(71) Applicant: HUAWEI TECHNOLOGIES CO., LTD., Guangdong (CN)

(72) Inventors: Qingpeng Xie, Shenzhen (CN); Jiali Fu, Shenzhen (CN); Peiyun Di, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/987,907

(22) Filed: Aug. 7, 2020

(65) Prior Publication Data

US 2020/0374335 A1 Nov. 26, 2020

Related U.S. Application Data

(63) Continuation of application No. 16/379,885, filed on Apr. 10, 2019, now Pat. No. 10,757,162, which is a
(Continued)

(30) Foreign Application Priority Data

Oct. 10, 2016 (CN) .......................... 201610884598.4

(51) Int. Cl.
*G06T 9/00* (2006.01)
*G06T 15/20* (2011.01)
(Continued)

(52) U.S. Cl.
CPC ............ *H04L 65/80* (2013.01); *G06T 3/0087* (2013.01); *G06T 3/4038* (2013.01); *G06T 9/00* (2013.01);
(Continued)

(58) Field of Classification Search
CPC ....... G06T 3/0087; G06T 3/4038; G06T 9/00; G06T 15/20; H04L 65/80; H04L 65/607; H04L 67/38; H04N 13/00
See application file for complete search history.

(56) References Cited

U.S. PATENT DOCUMENTS 6,222,675 B1 4/2001 Mall et al.
8,264,524 B1 * 9/2012 Davey ...................... H04N 7/18
348/36
(Continued)

FOREIGN PATENT DOCUMENTS

CN 104010225 A 8/2014
CN 104301769 A 1/2015
(Continued)

OTHER PUBLICATIONS

Office Action issued in Chinese Application No. 201680086877.4 dated Aug. 14, 2019, 26 pages (with English translation).
(Continued)

*Primary Examiner* — Jitesh Patel
(74) *Attorney, Agent, or Firm* — Fish & Richardson P.C.

(57) ABSTRACT

Example video data processing methods and apparatus are disclosed. One example method includes obtaining viewport information by a server. The server obtains spatial object information based on the viewport information, where the spatial object information is used to describe a specified spatial object in panoramic space. The server obtains a first bitstream, where the first bitstream is obtained by encoding image data in the specified spatial object. The server obtains a second bitstream, where the second bitstream is obtained by encoding image data in the panoramic space. The server transmits the first bitstream and the second bitstream to a client.

24 Claims, 12 Drawing Sheets

Related U.S. Application Data continuation of application No. PCT/CN2016/101823, filed on Oct. 11, 2016.

(51) Int. Cl.
*H04N 13/00* (2018.01)
*H04L 29/06* (2006.01)
*G06T 3/00* (2006.01)
*G06T 3/40* (2006.01)

(52) U.S. Cl.
CPC ............ *G06T 15/20* (2013.01); *H04L 65/607* (2013.01); *H04L 67/38* (2013.01); *H04N 13/00* (2013.01)

(56) References Cited

U.S. PATENT DOCUMENTS

| | | | | |
|---|---|---|---|---|
| 2002/0021353 | A1* | 2/2002 | DeNies | H04N 21/44222 348/36 |
| 2003/0172131 | A1* | 9/2003 | Ao | H04N 21/4621 709/219 |
| 2004/0027452 | A1* | 2/2004 | Yun | H04N 21/2393 348/51 |
| 2007/0115276 | A1* | 5/2007 | Yun | H04N 21/44012 345/419 |
| 2012/0147954 | A1* | 6/2012 | Kasai | H04N 21/6587 375/240.03 |
| 2012/0299920 | A1* | 11/2012 | Coombe | G06T 17/00 345/423 |
| 2013/0215281 | A1* | 8/2013 | Hobby | H04N 7/185 348/207.1 |
| 2015/0062287 | A1* | 3/2015 | Reinhardt | H04N 21/25841 348/36 |
| 2015/0082364 | A1* | 3/2015 | Jayaram | H04N 21/2387 725/109 |
| 2015/0130893 | A1 | 5/2015 | Kimura et al. | |
| 2015/0254882 | A1* | 9/2015 | Englert | G02B 27/0093 345/633 |
| 2016/0012855 | A1* | 1/2016 | Krishnan | G11B 27/105 386/241 |
| 2016/0071314 | A1* | 3/2016 | Nordstoga | G06T 19/003 345/427 |
| 2017/0118540 | A1* | 4/2017 | Thomas | H04N 19/167 |
| 2017/0195727 | A1 | 7/2017 | Di et al. | |
| 2017/0244775 | A1* | 8/2017 | Ha | H04N 13/194 |

FOREIGN PATENT DOCUMENTS

| | | |
|---|---|---|
| CN | 104735464 A | 6/2015 |
| CN | 105208368 A | 12/2015 |
| CN | 105898254 A | 8/2016 |
| CN | 105979239 A | 9/2016 |
| CN | 105979286 A | 9/2016 |
| WO | 2016109383 A1 | 7/2016 |

OTHER PUBLICATIONS

PCT International Search Report and Written Opinion issued in International Application No. PCT/CN2016/101823 dated Jun. 28, 2017, 16 pages (with English translation).
Search Report issued in Chinese Application No. 201680086877.4 dated Aug. 2, 2019, 2 pages.
Office Action issued in Chinese Application No. 201680086877.4 dated Mar. 3, 2021, 6 pages (with English translation).

* cited by examiner

VIDEO DATA PROCESSING METHOD AND APPARATUS

CROSS-REFERENCE TO RELATED APPLICATIONS

This application is a continuation of U.S. patent application Ser. No. 16/379,885, filed on Apr. 10, 2019, which is a continuation of International Application No. PCT/CN2016/101823, filed on Oct. 11, 2016, which claims priority to Chinese Patent Application No. 2016/0884598.4, filed on Oct. 10, 2016. All of the afore-mentioned patent applications are hereby incorporated by reference in their entireties.

TECHNICAL FIELD

The present disclosure relates to the streaming media data processing field, and in particular, to a video data processing method and an apparatus.

BACKGROUND

With increasing development and improvement of virtual reality (VR) technologies, increasing applications for viewing a VR video such as a VR video with a 360-degree viewport are presented to users. In a VR video viewing process, a user may change a viewport (field of view, FOV) at any time. Each viewport is corresponding to a video bitstream of a spatial object, and when the viewport changes, a VR video image presented to the viewport of the user also should change correspondingly.

In a prior-art VR video preparation phase, a server divides a VR panoramic video into a plurality of bitstreams corresponding to a plurality of fixed spatial objects, encodes a bitstream corresponding to each spatial object, and transmits the bitstream to a VR terminal. Each fixed spatial object is corresponding to a set of dynamic adaptive streaming over hypertext transfer protocol (HTTP) (dynamic adaptive streaming over HTTP, DASH) bitstreams. When a user changes a field of view, the terminal selects one or more fixed spatial objects in the video that include the spatial object based on a new spatial object obtained after the user changes the field of view, decodes bitstreams of the one or more fixed spatial objects, and presents, based on the new spatial object, video content corresponding to the spatial object. In the prior art, an amount of data transmitted between the server and the terminal is excessively large when quality needs to be ensured, and consequently cannot be supported in a network. In addition, a video with a maximum resolution imposes a strictest requirement on a decoding capability of the terminal, and consequently applicability is low. In a case in which an existing bandwidth is limited, if a relatively large compression rate is used for encoding and transmission, user viewing experience cannot be ensured. On the contrary, in the case in which an existing bandwidth is limited, if only content in a viewport of a user is transmitted, when the user changes the field of view, no content can be viewed because real-time performance cannot be implemented due to an existing network latency. Consequently, subjective viewing quality and timeliness of the user are severely affected, and applicability is low.

SUMMARY

I. Description of an MPEG-DASH Technology

On November 2011, an MPEG organization approves a DASH standard. The DASH standard is a dynamic adaptive streaming over HTTP technical specification (which is referred to as a DASH technical specification below). The DASH technical specification mainly includes two parts: a media presentation description (MPD) and a media file format.

1. The Media File Format

In DASH, a server prepares a plurality of versions of bitstreams for same video content, and each version of bitstream is referred to as a representation in the DASH standard. The representation is a set and an encapsulation of one or more bitstreams in a transmission format, and one representation includes one or more segments. Different versions of bitstreams may have different coding parameters such as bitrates and resolutions. Each bitstream is divided into a plurality of small files, and each small file is referred to as a segment. When a client requests media segment data, switching may be performed between different media representations. FIG. 3 is a schematic diagram of bitstream segment switching according to an embodiment of the present disclosure. The server prepares three different versions of bitstream data for one movie, and describes the three different versions of bitstream data in an MPD by using three representations (Representation, which is referred to as a rep for short below): a rep 1, a rep 2 and a rep 3. The rep 1 is a high-definition video with a bitrate of 4 mbps (megabits per second), the rep 2 is a standard-definition video with a bitrate of 2 mbps, and the rep 3 is a standard-definition video with a bitrate of 1 mbps. In FIG. 3, shaded segments are segment data that the client requests to play. The first three segments requested by the client are segments in the media representation rep 3, switching to the rep 2 is performed for requesting a fourth segment, and then switching to the rep 1 is performed for requesting a fifth segment and a sixth segment, and the like. Segments in each representation may be stored in one file in a head-to-tail manner, or may be separately stored as small files. The segment may be encapsulated in a format in ISO/IEC 14496-12 (ISO BMFF (Base Media File Format)), or may be encapsulated in a format in ISO/IEC 13818-1 (MPEG-2 TS).

2. The Media Presentation Description

In the DASH standard, the media presentation description is referred to as an MPD. The MPD may be an xml file, and information in the file is described in a hierarchical manner. As shown in FIG. 2, information at a previous level is completely inherited at a current level. Media metadata is described in the file, and the metadata may enable a client to know media content information on a server and construct, by using the information, an http-URL for requesting a segment.

In the DASH standard, a media presentation is a set of structured data for presenting media content. The media presentation description is a file for providing a standard description of the media presentation, and is used to provide a streaming media service. A group of consecutive periods form the entire media presentation, and the period is continuous and non-overlapping. A representation is a structured data set in which one or more media content components having descriptive metadata (an independent encoded media type such as audio or a video) are encapsulated, in other words, the representation is a set and an encapsulation of one or more bitstreams in a transmission format, and one representation includes one or more segments. An adaptation set represents a set of a plurality of interchangeable coding versions of a same media content component, and one adaptation set includes one or more representations. A subset is a combination of a group of adaptation sets, and when all the adaptation sets in the subset are played by using a player, corresponding media content may be obtained. Segment information is a media unit referenced by an HTTP uniform resource locator in the media presentation description, and the segment information describes media data segments. The media data segments may be stored in one file, or may be separately stored. In a possible manner, the MPD stores the media data segments.

For technical concepts related to the MPEG-DASH technology in the present disclosure, refer to related provisions in ISO/IEC 23009-1: 2014 Information technology-Dynamic adaptive streaming over HTTP (DASH)-Part 1: Media presentation description and segment formats, or refer to related provisions in a historical standard version, for example, ISO/IEC 23009-1: 2013 or ISO/IEC 23009-1: 2012.

II. Description of a Virtual Reality (VR) Technology

The virtual reality technology is a computer simulation system in which a virtual world can be created and experienced. In the virtual reality technology, a simulated environment is created by using a computer, and the virtual reality technology is interactive system simulation for three-dimensional dynamic visions and entity behavior and is for multi-source information fusion, so that a user can be immersed in the environment. The VR mainly includes a simulated environment, a perception, a natural skill, a sensing device, and the like. The simulated environment is a real-time and dynamic three-dimensional image generated by using a computer. The perception means that an ideal VR should have all perceptions that a person has. In addition to a visual perception generated by using a computer graphics technology, there are perceptions such as an auditory sense, a tactile sense, a force sense, a motion sense, and even a smell sense and a taste sense, and the perception is also referred to as a multi-modal perception. The natural skill is human head rotation, eye movement, gestures, or other body behavior and actions. The computer processes data corresponding to an action of a participant, responds to an input of a user in real time, and separately feeds back the input to five sense organs of the user. The sensing device is a three-dimensional interactive device. When a VR video (or a 360-degree video, or an omnidirectional video) is presented on a head mounted device and a handheld device, only a video image corresponding to a user head orientation and related audio are presented.

A difference between a VR video and a normal video lies in that entire video content of the normal video is presented to the user while only a subset of the entire VR video is presented to the user (in VR typically only a subset of the entire video region represented by the video pictures).

III. Spatial Description in an Existing DASH Standard

In the existing standard, spatial information is described as follows: "The SRD scheme allows Media Presentation authors to express spatial relationships between Spatial Objects. A Spatial Object is defined as a spatial part of a content component (for example, a region of interest, or a tile) and represented by either an Adaptation Set or a Sub-Representation."

In an MPD, spatial relationships (namely, spatial relationships) between spatial objects (namely, spatial objects) are described. A spatial object is defined as a spatial part of a content component, for example, an existing region of interest (ROI) and a tile. The spatial relationships may be described in an adaptation set and a sub-representation. In the existing DASH standard, some descriptor elements are defined in an MPD, and each descriptor element has two attributes: a schemeIdURI and a value. The schemeIdURI indicates a current descriptor, and the value is a parameter value of the descriptor. In the existing standard, there are two existing descriptors: a SupplementalProperty and an EssentialProperty (a supplemental property descriptor and an essential property descriptor). In the existing standard, if schemeIdURIs of the two descriptors are "urn:mpeg:dash:srd:2014" (or schemeIdURIs are urn:mpeg:dash:VR:2017), it indicates that the descriptors describe spatial information associated with a spatial object (spatial information associated to the containing spatial object), and corresponding values include a series of SDR parameter values.

FIG. 16 is a schematic diagram of streaming media-based video data processing according to an embodiment of the present disclosure. In this embodiment of the present disclosure, in some feasible implementations, a client may request a first bitstream based on viewport information of a user, and the client may further request a second bitstream. The first bitstream is obtained by encoding video data in a first spatial object, and the second bitstream is obtained by encoding video data in a second spatial object. The first spatial object is a local spatial object of the second spatial object. The first bitstream is a local bitstream, and the second bitstream may be a panoramic bitstream.

In some feasible implementations, the client may select, based on a change of a viewport of the user, a bitstream corresponding to the viewport for encoding and presentation.

In some feasible implementations, when a video image with a large viewport of 360 degrees is output, a server may divide space in a 360-degree viewport range to obtain a plurality of spatial objects. Each spatial object is corresponding to one sub-viewport of the user, and a plurality of sub-fields of view are spliced into a complete human-eye observation field of view. The human-eye observation viewport dynamically changes, and may be usually 90 degrees× 110 degrees, for example, a spatial object 1 corresponding to a box 1 and a spatial object 1 corresponding to a box 2 in FIG. 7. The server may prepare a set of video bitstreams for each spatial object. The server may obtain a coding configuration parameter of each bitstream in the video, and generates, based on the coding configuration parameter of the bitstream, a bitstream corresponding to each spatial object of the video. During video output, the client may request, from the server, a video bitstream segment corresponding to a viewport in a time period, and output the video bitstream segment to a spatial object corresponding to the field of view. If outputting, in a same time period, video bitstream segments corresponding to all fields of view in the 360-degree viewport range, the client may output and display a complete video image in the time period in the entire 360-degree space.

In specific implementation, when dividing the 360-degree space, the server may first map a spherical surface to a plane, and divide the space on the plane. The server may map the spherical surface to a latitude and longitude plan in a latitude and longitude mapping manner. FIG. 8 is a schematic diagram of a spatial object according to an embodiment of the present disclosure. The server may map the spherical surface to the latitude and longitude plan, and divide the latitude and longitude plan into a plurality of spatial objects such as a spatial object A to a spatial object I. Further, the server may alternatively map the spherical surface to a cube and then unfold a plurality of surfaces of the cube to obtain a plan, or may map the spherical surface to another polyhedron and then unfold a plurality of surfaces of the polyhedron to obtain a plan, or the like. The server may alternatively map the spherical surface to the plane in more mapping manners. A mapping manner may be determined based on an actual application scenario requirement, and is not limited herein. The following provides description in the latitude and longitude mapping manner with reference to FIG. 8.

As shown in FIG. 8, after the server divides a spatial object of the spherical surface into the plurality of spatial objects such as the spatial object A to the spatial object 1, the server may prepare a set of DASH bitstreams for each spatial object. Each spatial object is corresponding to one sub-field of view. A bitstream corresponding to each sub-viewport is a part of an entire video bitstream, and bitstreams corresponding to all the sub-fields of view form the complete video bitstream. In a video play process, the client may select, based on a current viewport of the user, a DASH bitstream corresponding to a corresponding spatial object to play.

Embodiments of the present disclosure provide a video data processing method and an apparatus, so as to improve video data transmission applicability and video data selection diversity, and improve user video viewing experience.

According to a first aspect, a video data processing method is provided, and the method may include:

obtaining, by a server, viewport information;

obtaining, by the server, spatial object information based on the viewport information, where the spatial object information is used to describe a specified spatial object in panoramic space;

obtaining, by the server, a first bitstream, where the first bitstream is obtained by encoding image data in the specified spatial object;

obtaining, by the server, a second bitstream, where the second bitstream is obtained by encoding image data in the panoramic space: and transmitting, by the server, the first bitstream and the second bitstream to a client.

In this embodiment of the present disclosure, the server may determine the spatial object information based on the viewport information, may transmit, to the client, the bitstream obtained by encoding the image data included in the specified spatial object described by using the spatial object information, and may further transmit, to the client, the bitstream obtained by encoding the image data in the panoramic space, so that the client performs adaptive selection and play, thereby improving video data transmission applicability and video data selection diversity, and improving user video viewing experience.

In a possible implementation in this embodiment of the present disclosure, the viewport information includes location information of a viewport of a user in the panoramic space; and the location information includes at least one of a center location, a start location, a left included angle and a right included angle of the center location, an upper included angle and a lower included angle of the center location, a length, and a width.

In this embodiment of the present disclosure, viewport information represented in a plurality of forms may be provided for the server, so as to provide flexible selection, and improve video data processing applicability.

In a possible implementation in this embodiment of the present disclosure, the viewport information includes a difference between location information of a viewport of a user at a current moment in the panoramic space and location information of a viewport of the user at a previous moment in the panoramic space; and the location information includes at least one of a center location, a start location, a left included angle and a right included angle of the center location, an upper included angle and a lower included angle of the center location, a length, and a width.

In this embodiment of the present disclosure, viewport information represented in a plurality of forms may be provided for the server, so as to provide flexible selection, and improve video data processing applicability.

In a possible implementation in this embodiment of the present disclosure, the viewport information further includes displayed resolution information.

In this embodiment of the present disclosure, the displayed resolution information may be provided for the server as the viewport information, so as to provide diversified selection of the viewport information for the server, and improve applicability.

In a possible implementation in this embodiment of the present disclosure, the specified spatial object is:

a spatial object corresponding to a viewport of a user at a current moment in the panoramic space; or a spatial object obtained by adjusting a spatial object corresponding to a viewport of a user at a current moment in the panoramic space.

In this embodiment of the present disclosure, the server may determine the specified spatial object in a plurality of manners, so as to increase a selection range of image data of the first bitstream, thereby implementing a more flexible operation, and achieving higher applicability.

In a possible implementation in this embodiment of the present disclosure, the spatial object corresponding to the viewport of the user at the current moment in the panoramic space is an initial spatial object, and the spatial object obtained by adjusting the spatial object corresponding to the viewport of the user at the current moment in the panoramic space includes:

a spatial object obtained by scaling or extending the initial spatial object based on a preset proportion: or a spatial object obtained by scaling or extending the initial spatial object based on an adjustment proportion, where the adjustment proportion is determined based on the initial spatial object; or a spatial object obtained by scaling or extending the initial spatial object based on an adjustment proportion fed back by the client.

In this embodiment of the present disclosure, the server may determine the specified spatial object in a plurality of manners, so as to increase a selection range of image data of the first bitstream, thereby implementing a more flexible operation, and achieving higher applicability.

In a possible implementation in this embodiment of the present disclosure, the transmitting, by the server, the first bitstream and the second bitstream to a client includes:

selecting, by the server from the second bitstream based on a network status of the server, a bitstream corresponding to a preset spatial object; and transmitting the first bitstream and the bitstream corresponding to the preset spatial object to the client.

In this embodiment of the present disclosure, the server may select a part of the second bitstream based on the network status of the server, and transmit the part of the second bitstream to the client, so as to implement a more flexible operation, and achieve higher applicability. The preset spatial object may be the spatial object corresponding to the viewport of the user at the current moment, may be a part of the specified spatial object that is greater than the spatial object corresponding to the viewport of the user at the current moment, or may be a spatial object greater than the specified spatial object and less than the panoramic space.

In a possible implementation in this embodiment of the present disclosure, the transmitting, by the server, the first bitstream and the second bitstream to a client includes:

selecting, by the server from the first bitstream based on a network status of the server, a bitstream corresponding to a preset spatial object; and transmitting the second bitstream and the bitstream corresponding to the preset spatial object to the client.

In this embodiment of the present disclosure, the server may select a part of the second bitstream based on the network status of the server, and transmit the part of the second bitstream to the client, so as to implement a more flexible operation, and achieve higher applicability. The preset spatial object may be the spatial object corresponding to the viewport of the user at the current moment, or may be a part of the specified spatial object that is greater than the spatial object corresponding to the viewport of the user at the current moment.

In a possible implementation in this embodiment of the present disclosure, the transmitting, by the server, the first bitstream and the second bitstream to a client includes:

selecting, by the server from the first bitstream based on a network status of the server, a bitstream corresponding to a first preset spatial object, and selecting, from the second bitstream, a bitstream corresponding to a second preset spatial object; and transmitting the bitstream corresponding to the first preset spatial object and the bitstream corresponding to the second preset spatial object to the client.

In this embodiment of the present disclosure, the server may select a part of the first bitstream and a part of the second bitstream based on the network status of the server, and transmit the part of the first bitstream and the part of the second bitstream to the client, so as to implement a more flexible operation, and achieve higher applicability. The first preset spatial object may be the spatial object corresponding to the viewport of the user at the current moment, may be a part of the specified spatial object that is greater than the spatial object corresponding to the viewport of the user at the current moment, or may be a spatial object greater than the specified spatial object and less than the panoramic space. The second preset spatial object may be the spatial object corresponding to the viewport of the user at the current moment, or may be a part of the specified spatial object that is greater than the spatial object corresponding to the viewport of the user at the current moment.

In a possible implementation in this embodiment of the present disclosure, the obtaining, by the server, a first bitstream includes:

obtaining, by the server, an image data processing format supported by the client; and encoding, based on the image data processing format, the image data included in the specified spatial object, to obtain the first bitstream having the image data processing format, where the image data processing format includes at least one of an image data play format or an image data decoding format.

In this embodiment of the present disclosure, the server may perform encoding based on the image data processing format supported by the client, to obtain a corresponding bitstream, so that the client performs decoding and play, so as to implement a simpler operation, and achieve higher applicability.

In a possible implementation in this embodiment of the present disclosure, the obtaining, by the server, a second bitstream includes:

obtaining, by the server, an image data processing format supported by the client; and encoding, based on the image data processing format, the image data included in the panoramic space, to obtain the second bitstream having the image data processing format, where the image data processing format includes at least one of an image data play format or an image data decoding format.

In this embodiment of the present disclosure, the server may perform encoding based on the image data processing format supported by the client, to obtain a corresponding bitstream, so that the client performs decoding and play, so as to implement a simpler operation, and achieve higher applicability.

In a possible implementation in this embodiment of the present disclosure, the obtaining, by the server, a first bitstream includes:

selecting, by the server from at least one prestored encoded bitstream, a specified bitstream corresponding to the specified spatial object, to use the specified bitstream as the first bitstream, where each of the at least one encoded bitstream is corresponding to one spatial object in the panoramic space.

In this embodiment of the present disclosure, the server may select a corresponding bitstream from the encoded bitstream, so as to implement a simpler operation, improve video data processing efficiency, and achieve higher applicability.

According to a second aspect, a video data processing method is provided, and the method may include:

receiving, by a client, a first bitstream, where the first bitstream is obtained by encoding image data in a specified spatial object, and the specified spatial object is a spatial object in panoramic space;

receiving, by the client, a second bitstream, where the second bitstream is obtained by encoding image data in the panoramic space:

determining, by the client, a bitstream play mode based on viewport information of a user at a current moment; and playing, by the client, the second bitstream and the first bitstream based on the bitstream play mode.

In this embodiment of the present disclosure, the client may determine the bitstream play mode based on the viewport of the user at the current moment, and select a corresponding bitstream from a plurality of received bitstreams to play, so as to improve bitstream play selection diversity, improve video data processing flexibility, and improve user video viewing experience.

In a possible implementation in this embodiment of the present disclosure, the play mode includes at least one of superposition play, supplementary play, or sampling play.

In a possible implementation in this embodiment of the present disclosure, the viewport information includes location information of a viewport of the user in the panoramic space: and the location information includes at least one of a center location, a start location, a left included angle and a right included angle of the center location, an upper included angle and a lower included angle of the center location, a length, and a width.

In a possible implementation in this embodiment of the present disclosure, the viewport information includes a difference between location information of a viewport of the user at the current moment in the panoramic space and location information of a viewport of the user at a previous moment in the panoramic space; and the location information includes at least one of a center location, a start location, a left included angle and a right included angle of the center location, an upper included angle and a lower included angle of the center location, a length, and a width.

In a possible implementation in this embodiment of the present disclosure, the viewport information further includes displayed resolution information.

In a possible implementation in this embodiment of the present disclosure, the play mode is the superposition play; and the playing, by the client, the second bitstream and the first bitstream based on the bitstream play mode includes:

decoding, by the client, the first bitstream and the second bitstream, and performing superposition play on images of two decoded bitstreams.

In this embodiment of the present disclosure, the client may perform superposition play on the images of the two decoded bitstreams, so as to ensure both video data play quality and video play continuity, and achieve higher applicability.

In a possible implementation in this embodiment of the present disclosure, the play mode is the supplementary play; and the playing, by the client, the second bitstream and the first bitstream based on the bitstream play mode includes:

decoding, by the client, the first bitstream and the second bitstream, and supplementing an image of a decoded second bitstream to an image of a decoded first bitstream for play.

In this embodiment of the present disclosure, if a spatial object corresponding to the viewport of the user at the current moment is not completely covered by the specified spatial object, the client may select some bitstreams from the image of the decoded second bitstream, and supplement the selected bitstreams to some spatial objects that are not covered by the specified spatial object, to ensure image display integrity in the viewport of the user at the current moment, so as to ensure both video data play quality and video play continuity and integrity, and achieve higher applicability.

In a possible implementation in this embodiment of the present disclosure, the play mode is the sampling play; and the playing, by the client, the second bitstream and the first bitstream based on the bitstream play mode includes:

decoding, by the client, the second bitstream, sampling an image of a decoded second bitstream based on a resolution of an image corresponding to the first bitstream, to obtain a sampled image, and playing the sampled image.

In this embodiment of the present disclosure, the client may decode the second bitstream, and sample the image of the second bitstream based on the resolution of the image corresponding to the second bitstream, and only one bitstream needs to be decoded, so as to achieve higher processing efficiency, ensure video data play quality, reduce resources, and achieve higher applicability.

In a possible implementation in this embodiment of the present disclosure, the playing, by the client, the second bitstream and the first bitstream based on the bitstream play mode includes:

decoding, by the client, the second bitstream and the first bitstream based on an image data processing format supported by the client, and playing decoded images based on the play mode; or decoding, by the client, the second bitstream and a part of the first bitstream based on an image data processing format supported by the client, and playing decoded images based on the play mode; or decoding, by the client, a part of the second bitstream and the first bitstream based on an image data processing format supported by the client, and playing decoded images based on the play mode; or decoding, by the client, a part of the second bitstream and a part of the first bitstream based on an image data processing format supported by the client, and playing decoded images based on the play mode, where the image data processing format includes at least one of an image data play format or an image data decoding format.

In this embodiment of the present disclosure, the client may adaptively select and play a plurality of received bitstreams based on the image data processing format supported by the client, so as to implement a more flexible operation, and achieve higher applicability.

In a possible implementation in this embodiment of the present disclosure, the playing, by the client, the second bitstream and the first bitstream based on the bitstream play mode includes:

selecting, by the client, a target bitstream from the second bitstream and the first bitstream based on an image data play mode selected by the user, decoding the target bitstream, and playing a decoded image based on the play mode.

In this embodiment of the present disclosure, the client may select some bitstreams from a plurality of bitstreams to play based on the play mode selected by the user, so as to provide a closer association with user selection, and improve user video play experience.

In a possible implementation in this embodiment of the present disclosure, the method further includes:

determining, based on the viewport information of the user at the current moment, a spatial object corresponding to a viewport of the user at the current moment, and displaying the image data play mode at a specified display location of the spatial object corresponding to the field of view.

In this embodiment of the present disclosure, the client may select some bitstreams from a plurality of bitstreams to play based on the play mode selected by the user, and display the play mode, so as to provide a closer association with user selection, and improve user video play experience.

In a possible implementation in this embodiment of the present disclosure, the method further includes:

determining, based on the viewport information of the user at the current moment, a spatial object corresponding to a viewport of the user at the current moment, and determining a location, in the panoramic space, of the spatial object corresponding to the viewport of the user at the current moment; and displaying a schematic diagram of the location at a specified display location of the spatial object corresponding to the viewport of the user at the current moment.

In this embodiment of the present disclosure, the client may present, to the user, a location of a spatial object corresponding to a currently played video image in the panoramic space, so as to improve intuitive visibility of the viewport of the user, achieve higher applicability, provide a closer association with the user, and improve user video play experience.

According to a third aspect, a server is provided, and the server may include:

an obtaining module, configured to obtain viewport information, where the obtaining module is further configured to obtain spatial object information based on the viewport information, where the spatial object information is used to describe a specified spatial object in panoramic space;

the obtaining module is further configured to obtain a first bitstream, where the first bitstream is obtained by encoding image data in the specified spatial object; and the obtaining module is further configured to obtain a second bitstream, where the second bitstream is obtained by encoding image data in the panoramic space; and a transmission module, configured to transmit the first bitstream and the second bitstream that are obtained by the obtaining module to a client.

In a possible implementation in this embodiment of the present disclosure, the viewport information includes location information of a viewport of a user in the panoramic space; and the location information includes at least one of a center location, a start location, a left included angle and a right included angle of the center location, an upper included angle and a lower included angle of the center location, a length, and a width.

In a possible implementation in this embodiment of the present disclosure, the viewport information includes a difference between location information of a viewport of a user at a current moment in the panoramic space and location information of a viewport of the user at a previous moment in the panoramic space; and the location information includes at least one of a center location, a start location, a left included angle and a right included angle of the center location, an upper included angle and a lower included angle of the center location, a length, and a width.

In a possible implementation in this embodiment of the present disclosure, the viewport information further includes displayed resolution information.

In a possible implementation in this embodiment of the present disclosure, the specified spatial object is:

a spatial object corresponding to a viewport of a user at a current moment in the panoramic space; or a spatial object obtained by adjusting a spatial object corresponding to a viewport of a user at a current moment in the panoramic space.

In a possible implementation in this embodiment of the present disclosure, the spatial object corresponding to the viewport of the user at the current moment in the panoramic space is an initial spatial object, and the spatial object obtained by adjusting the spatial object corresponding to the viewport of the user at the current moment in the panoramic space includes:

a spatial object obtained by scaling or extending the initial spatial object based on a preset proportion; or a spatial object obtained by scaling or extending the initial spatial object based on an adjustment proportion, where the adjustment proportion is determined based on the initial spatial object; or a spatial object obtained by scaling or extending the initial spatial object based on an adjustment proportion fed back by the client.

In a possible implementation in this embodiment of the present disclosure, the transmission module is configured to:

select, based on a network status of the server from the second bitstream obtained by the obtaining module, a bitstream corresponding to a preset spatial object, and transmit the first bitstream and the bitstream corresponding to the preset spatial object to the client.

In a possible implementation in this embodiment of the present disclosure, the transmission module is configured to:

select, based on a network status of the server from the first bitstream obtained by the obtaining module, a bitstream corresponding to a preset spatial object, and transmit the second bitstream and the bitstream corresponding to the preset spatial object to the client.

In a possible implementation in this embodiment of the present disclosure, the transmission module is configured to:

select, based on a network status of the server from the first bitstream obtained by the obtaining module, a bitstream corresponding to a first preset spatial object, and select, from the second bitstream obtained by the obtaining module, a bitstream corresponding to a second preset spatial object; and transmit the bitstream corresponding to the first preset spatial object and the bitstream corresponding to the second preset spatial object to the client.

In a possible implementation in this embodiment of the present disclosure, the obtaining module is configured to:

obtain an image data processing format supported by the client; and encode, based on the image data processing format, the image data included in the specified spatial object, to obtain the first bitstream having the image data processing format, where the image data processing format includes at least one of an image data play format or an image data decoding format.

In a possible implementation in this embodiment of the present disclosure, the obtaining module is configured to:

obtain an image data processing format supported by the client; and encode, based on the image data processing format, the image data included in the panoramic space, to obtain the second bitstream having the image data processing format, where the image data processing format includes at least one of an image data play format or an image data decoding format.

In a possible implementation in this embodiment of the present disclosure, the obtaining module is configured to:

select, from at least one prestored encoded bitstream, a specified bitstream corresponding to the specified spatial object, to use the specified bitstream as the first bitstream, where each of the at least one encoded bitstream is corresponding to one spatial object in the panoramic space.

According to a fourth aspect, a client is provided, and the client may include:

a receiving module, configured to receive a first bitstream, where the first bitstream is obtained by encoding image data in a specified spatial object, and the specified spatial object is a spatial object in panoramic space, where the receiving module is further configured to receive a second bitstream, where the second bitstream is obtained by encoding image data in the panoramic space;

a determining module, configured to determine a bitstream play mode based on viewport information of a user at a current moment; and a play module, configured to play, based on the bitstream play mode determined by the determining module, the second bitstream and the first bitstream that are received by the receiving module.

In a possible implementation in this embodiment of the present disclosure, the play mode includes at least one of superposition play, supplementary play, or sampling play.

In a possible implementation in this embodiment of the present disclosure, the viewport information includes location information of a viewport of the user in the panoramic space; and the location information includes at least one of a center location, a start location, a left included angle and a right included angle of the center location, an upper included angle and a lower included angle of the center location, a length, and a width.

In a possible implementation in this embodiment of the present disclosure, the viewport information includes a difference between location information of a viewport of the user at the current moment in the panoramic space and location information of a viewport of the user at a previous moment in the panoramic space; and the location information includes at least one of a center location, a start location, a left included angle and a right included angle of the center location, an upper included angle and a lower included angle of the center location, a length, and a width.

In a possible implementation in this embodiment of the present disclosure, the viewport information further includes displayed resolution information.

In a possible implementation in this embodiment of the present disclosure, the play mode is the superposition play; and the play module is configured to:

decode the first bitstream and the second bitstream that are received by the receiving module, and perform superposition play on images of two decoded bitstreams.

In a possible implementation in this embodiment of the present disclosure, the play mode is the supplementary play; and the play module is configured to:

decode the first bitstream and the second bitstream that are received by the receiving module, and supplement an image of a decoded second bitstream to an image of a decoded first bitstream for play.

In a possible implementation in this embodiment of the present disclosure, the play mode is the sampling play; and the play module is configured to:

decode the second bitstream received by the receiving module, sample an image of a decoded second bitstream based on a resolution of an image corresponding to the first bitstream, to obtain a sampled image, and play the sampled image.

In a possible implementation in this embodiment of the present disclosure, the play module is configured to:

decode the second bitstream and the first bitstream based on an image data processing format supported by the client, and play decoded images based on the play mode; or decode the second bitstream and a part of the first bitstream based on an image data processing format supported by the client, and play decoded images based on the play mode; or decode a part of the second bitstream and the first bitstream based on an image data processing format supported by the client, and play decoded images based on the play mode; or decode a part of the second bitstream and a part of the first bitstream based on an image data processing format supported by the client, and play decoded images based on the play mode, where the image data processing format includes at least one of an image data play format or an image data decoding format.

In a possible implementation in this embodiment of the present disclosure, the play module is configured to:

select a target bitstream from the second bitstream and the first bitstream based on an image data play mode selected by the user, decode the target bitstream, and play a decoded image based on the play mode.

In a possible implementation in this embodiment of the present disclosure, the determining module is further configured to:

determine, based on the viewport information of the user at the current moment, a spatial object corresponding to a viewport of the user at the current moment; and the play module is further configured to:

display the image data play mode at a specified display location of the spatial object that is corresponding to the viewport and that is determined by the determining module.

In a possible implementation in this embodiment of the present disclosure, the determining module is further configured to:

determine, based on the viewport information of the user at the current moment, a spatial object corresponding to a viewport of the user at the current moment, and determine a location, in the panoramic space, of the spatial object corresponding to the viewport of the user at the current moment; and the play module is further configured to:

display a schematic diagram of the location at a specified display location of the spatial object that is corresponding to the viewport of the user at the current moment and that is determined by the determining module.

According to a fifth aspect, a video data processing system is provided, and the video data processing system may include the client provided in the third aspect and the server provided in the fourth aspect.

According to a sixth aspect, a streaming media-based video data processing method is provided, and the method may include:

obtaining, by a client, viewport information of a user, where the viewport information of the user is used to indicate a viewport of the user at a current moment;

obtaining, by the client, a first bitstream based on the viewport information of the user, where the first bitstream is obtained by encoding video data in a first spatial object; and obtaining, by the client, a second bitstream, where the second bitstream is obtained by encoding video data in a second spatial object, and the first spatial object is a part of the second spatial object.

In a possible implementation in this embodiment of the present disclosure, the method further includes:

receiving, by the client, a media presentation description; and the obtaining, by the client, a first bitstream based on the viewport information of the user includes:

obtaining a first bitstream request based on the media presentation description and the viewport information of the user;

sending the first bitstream request to a server: and receiving the first bitstream sent by the server.

In a possible implementation in this embodiment of the present disclosure, spatial content corresponding to the second spatial object is panoramic spatial content.

In a possible implementation in this embodiment of the present disclosure, the method further includes:

presenting, by the client, the first bitstream; and when the viewport of the user changes, presenting the second bitstream based on a changed viewport of the user.

FIG. 17 is another schematic diagram of a spatial object change corresponding to a viewport change. As described in the figure, space presented by a VR video is divided into nine spatial objects: a spatial object A to a spatial object I. A dashed-line box in FIG. 17 may indicate a currently presented spatial object (namely, a current spatial object), and a solid-line box may indicate a presented spatial object obtained after the viewport changes (namely, a target spatial object).

In a small diagram on the left of FIG. 17, a viewport corresponding to the current spatial object includes spatial objects A, B. D, and E, and a viewport corresponding to the target spatial object obtained after the viewport changes may include spatial objects B, C, E, and F, or a viewport corresponding to the target spatial object obtained after the viewport changes may include spatial objects C and F. This is not limited herein. In a small diagram in the middle of FIG. 17, a viewport corresponding to the current spatial object includes spatial objects A, B, D, and E, and a viewport corresponding to the target spatial object obtained after the viewport changes may include spatial objects E, F, H, and I, or a viewport corresponding to the target spatial object obtained after the viewport changes may include spatial objects F, H, and I. This is not limited herein. In a small diagram on the right of FIG. 17, a viewport corresponding to the current spatial object may include spatial objects A and B, and a viewport corresponding to the target spatial object obtained after the viewport changes includes spatial objects E, F, H, and I. This is not limited herein.

According to a seventh aspect, a client is provided, and the client may include a receiver, a processor, and a memory:
the memory is configured to store a set of program code;
the processor and the receiver are configured to invoke the program code stored in the memory, to perform the following operations:
the processor is configured to obtain viewport information of a user, where the viewport information of the user is used to indicate a viewport of the user at a current moment:
the processor is further configured to obtain a first bitstream based on the viewport information of the user, where the first bitstream is obtained by encoding video data in a first spatial object; and
the receiver is configured to obtain a second bitstream, where the second bitstream is obtained by encoding video data in a second spatial object, and the first spatial object is a part of the second spatial object.

In a possible implementation in this embodiment of the present disclosure, the receiver is further configured to receive a media presentation description:
the processor is configured to:
obtain a first bitstream request based on the media presentation description received by the receiver and the viewport information of the user;
the client further includes:
a transmitter, configured to send the first bitstream request obtained by the processor to a server; and
the processor is configured to receive, by using the receiver, the first bitstream sent by the server.

In a possible implementation in this embodiment of the present disclosure, spatial content corresponding to the second spatial object is panoramic spatial content.

In a possible implementation in this embodiment of the present disclosure, the client further includes:
a display, configured to: present the first bitstream received by using the receiver, and when the viewport of the user changes, present the second bitstream based on a changed viewport of the user.

In the embodiments of the present disclosure, the server may determine the spatial object information based on the viewport information, may transmit, to the client, the bitstream obtained by encoding the image data included in the specified spatial object described by using the spatial object information, and may further transmit, to the client, the bitstream obtained by encoding the image data in the panoramic space, so that the client performs adaptive selection and play, thereby improving video data transmission applicability and video data selection diversity, and improving user video viewing experience. The server may further encode and partially transmit the image data based on information such as the network status of the server and the image data processing format of the client, so as to implement a more flexible operation, and achieve higher applicability. The client may determine the bitstream play mode based on the viewport of the user at the current moment, and select a corresponding bitstream from a plurality of received bitstreams to play, so as to improve bitstream play selection diversity, improve video data processing flexibility, and improve user video viewing experience. The client may further select and play some bitstreams based on the information such as the network status of the client, the image data processing format, and the decoding format, so as to implement a more flexible operation.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure.

Figure 1:
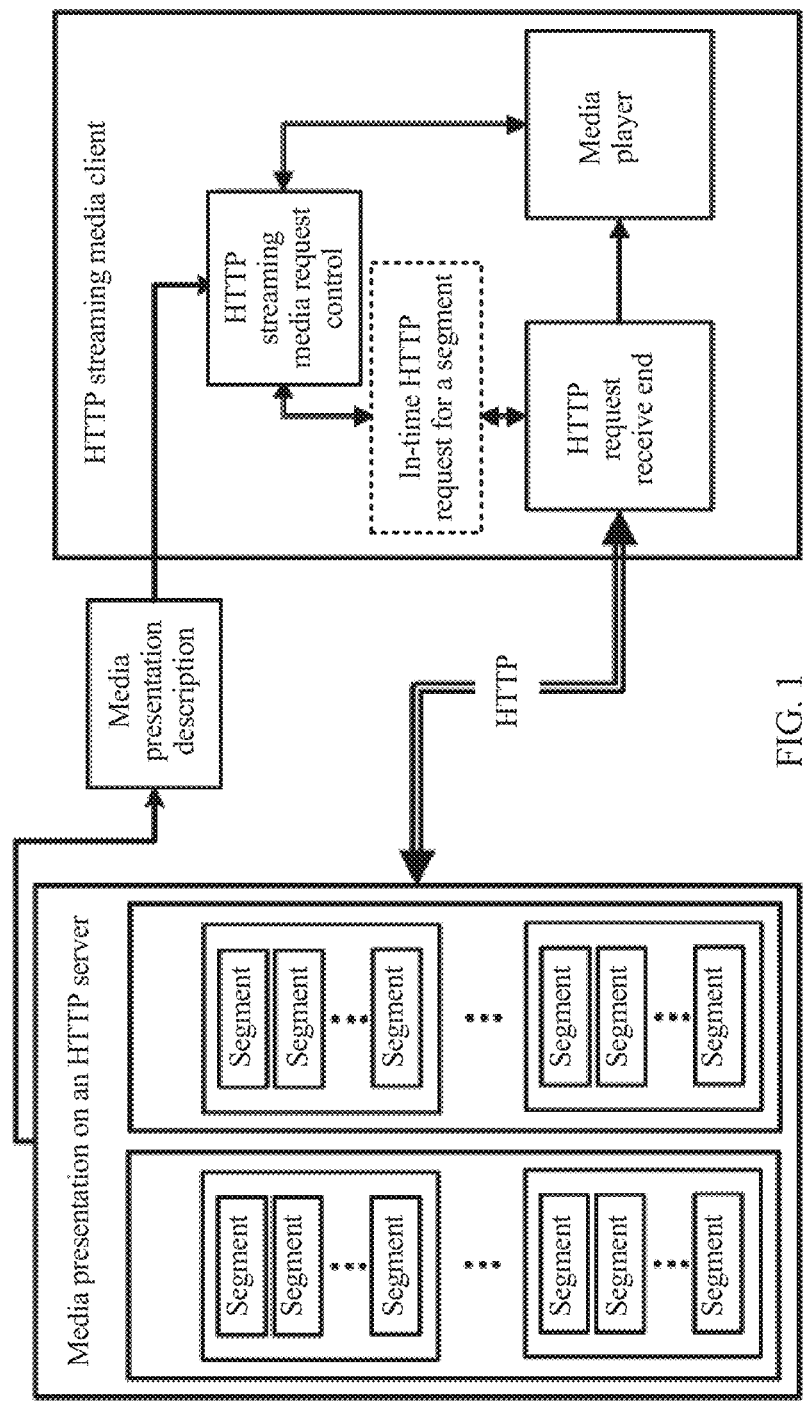
FIG. 1 is a schematic diagram of an instance of a DASH standard transmission frame used in system-layer video streaming media transmission.

In a current client-orientated system-layer video streaming media transmission solution, a DASH standard frame may be used. FIG. 1 is a schematic diagram of an instance of a DASH standard transmission frame used in system-layer video streaming media transmission. A data transmission process in the system-layer video streaming media transmission solution includes two processes: a process in which a server (for example, an HTTP server or a media content preparation server, which is referred to as a server for short below) generates media data for video content, and responds to a request from a client, and a process in which the client (for example, an HTTP streaming media client) requests and obtains the media data from the server. The media data includes a media presentation description (MPD) and a media bitstream. An MPD on the server includes a plurality of representations (which are also referred to as a representation), and each representation describes a plurality of segments. An HTTP streaming media request control module of the client obtains an MPD sent by the server, analyzes the MPD, determines information about each segment of a video bitstream described in the MPD, to determine a to-be-requested segment, sends an HTTP request for the corresponding segment to the server, and performs decoding and play by using a media player.

(1) In the process in which the server generates the media data for the video content, the media data generated by the server for the video content includes different versions of bitstreams corresponding to the video content and MPDs of the bitstreams. For example, the server generates a bitstream with a low resolution, a low bitrate, and a low frame rate (for example, a resolution of 360 p, a bitrate of 300 kbps, and a frame rate of 15 fps), a bitstream with an intermediate resolution, an intermediate bitrate, and a high frame rate (for example, a resolution of 720 p, a bitrate of 1200 kbps, and a frame rate of 25 fps), a bitstream with a high resolution, a high bitrate, and a high frame rate (for example, a resolution of 1080 p, a bitrate of 3000 kbps, and a frame rate of 25 fps), and the like for video content of a same TV series episode.

Figure 2:
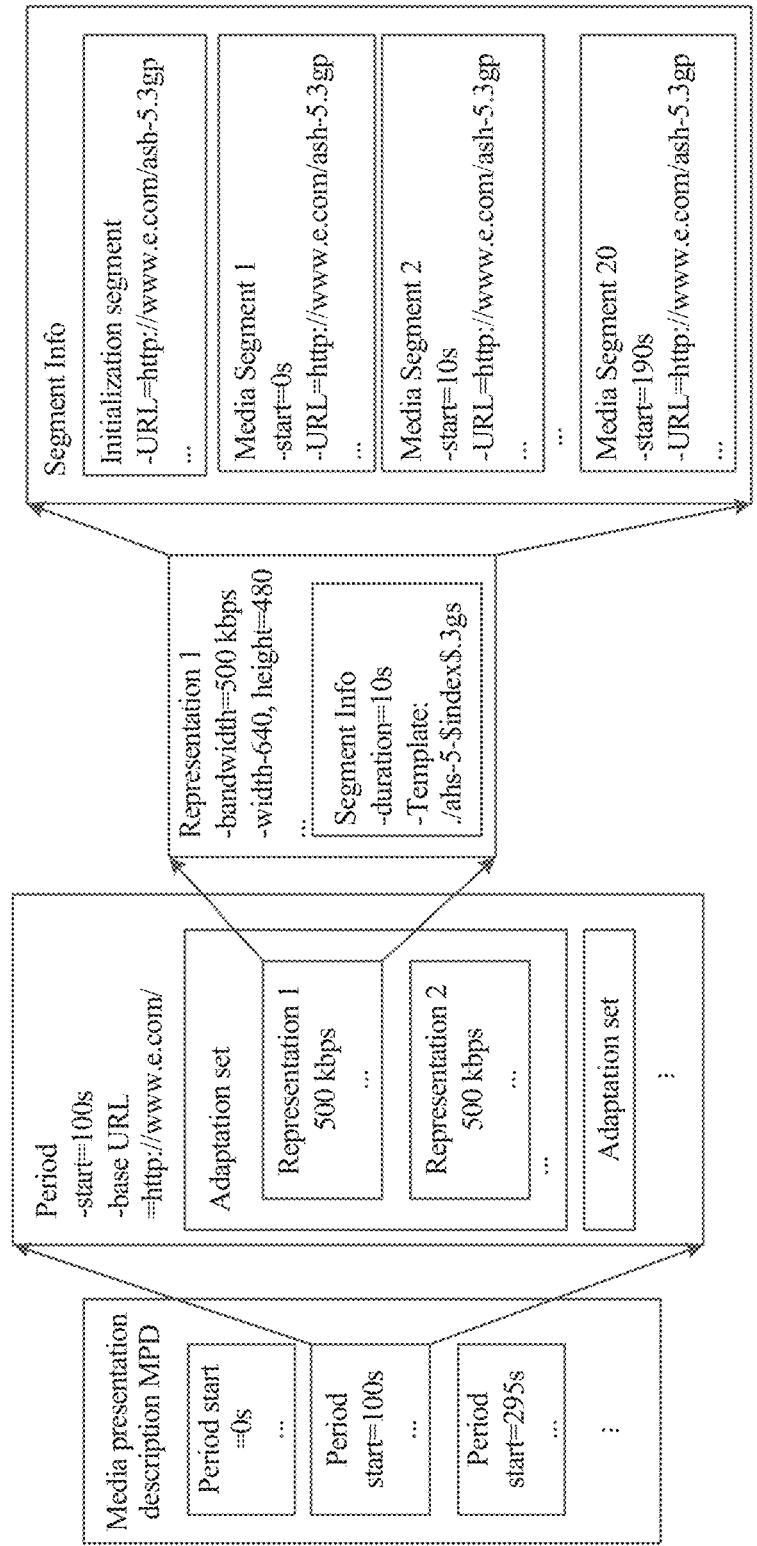
FIG. 2 is a schematic structural diagram of a DASH standard transmission MPD used in system-layer video streaming media transmission.
Figure 3:
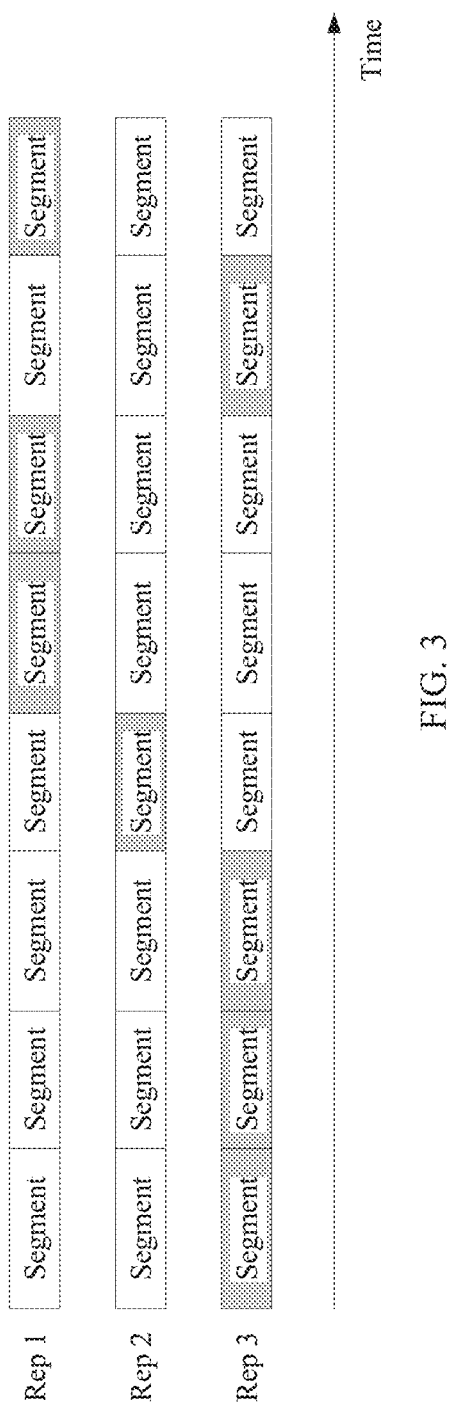
FIG. 3 is a schematic diagram of bitstream segment switching according to an embodiment of the present disclosure.

In addition, the server may further generate an MPD for the video content of the TV series episode. FIG. 2 is a schematic structural diagram of a DASH standard MPD in a system transmission solution. The MPD of the bitstream includes a plurality of periods For example, "period start=100 s" in the MPD in FIG. 2 may include a plurality of adaptation sets, and each adaptation set may include a plurality of representations such as a representation 1 and a representation 2. Each representation describes one or more segments of the bitstream.

In an embodiment of the present disclosure, each representation describes information about several segments in a time sequence, for example, an initialization segment, a media segment 1, a media segment 2, . . . , and a media segment 20. The representation may include segment information such as a play start moment, play duration, and a network storage address (for example, a network storage address represented in a form of a uniform resource locator (URL)).

(2) In the process in which the client requests and obtains the media data from the server, when a user selects a video to play, the client obtains a corresponding MPD from the server based on the video content selected by the user. The client sends, to the server based on a network storage address of a bitstream segment described in the MPD, a request for downloading the bitstream segment corresponding to the network storage address, and the server sends the bitstream segment to the client based on the received request. After obtaining the bitstream segment sent by the server, the client may perform operations such as decoding and play by using the media player.

In the system-layer video streaming media transmission solution, a DASH standard is used, and the client analyzes an MPD, requests video data from the server as required, and receives the data sent by the server, so as to implement transmission of the video data.

Figure 4:
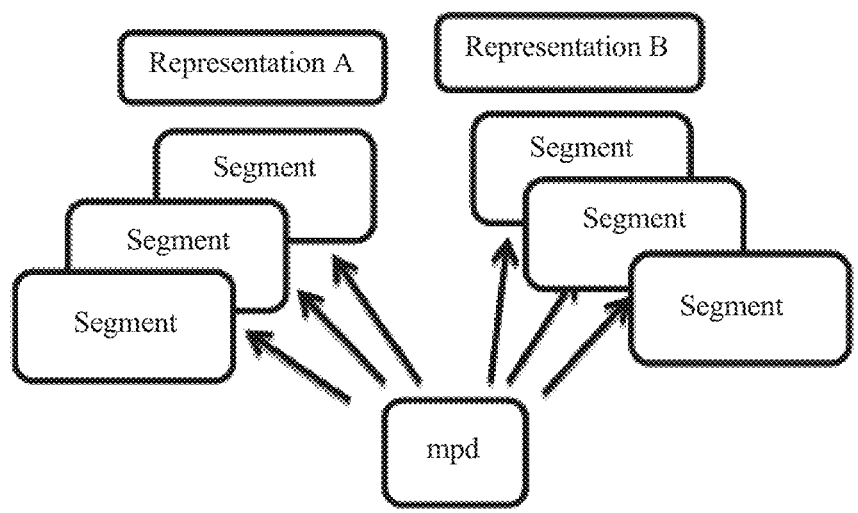
FIG. 4 is a schematic diagram of a segment storage manner in bitstream data.
Figure 5:
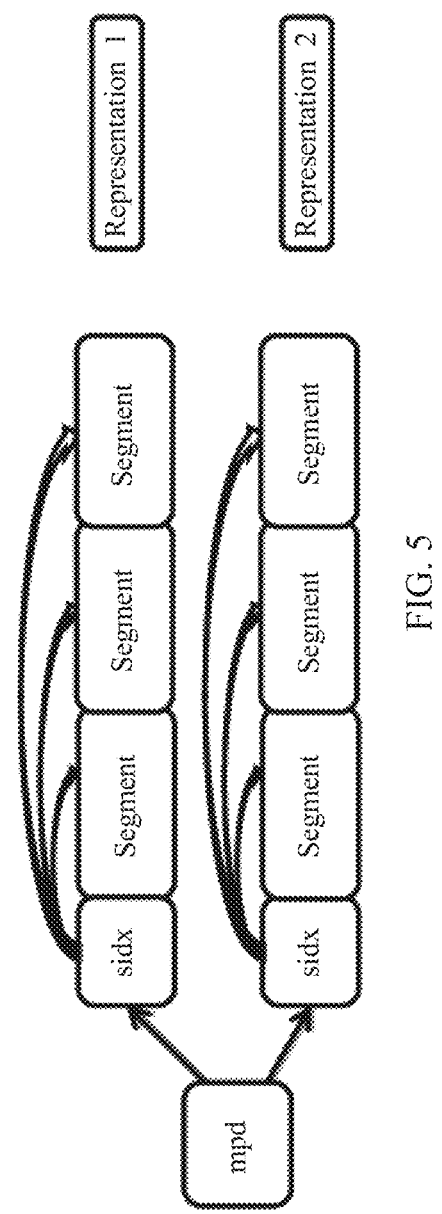
FIG. 5 is another schematic diagram of a segment storage manner in bitstream data.
Figure 6:
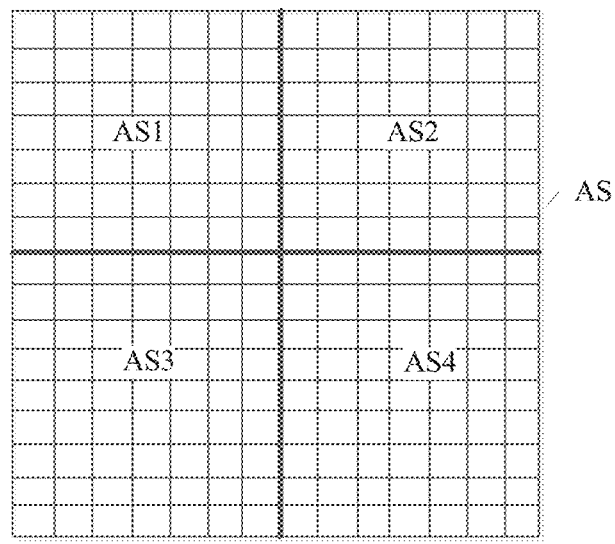
FIG. 6 is a schematic diagram of a spatial relationship between spatial objects.

It is learned from a DASH media file format that there are two segment storage manners. In one manner, all segments are separately stored, which is shown in FIG. 4, and FIG. 4 is a schematic diagram of a segment storage manner in bitstream data. In the other manner, all segments in a same rep are stored in one file, which is shown in FIG. 5, and FIG. 5 is another schematic diagram of a segment storage manner in bitstream data. As shown in FIG. 4, each of segments in a rep A is independently stored as one file, and each of segments in a rep B is also independently stored as one file. Correspondingly, in the storage manner shown in FIG. 4, the server may describe information about each segment such as a URL in a form of a template or a list in the MPD of the bitstream. As shown in FIG. 5, all segments in a rep 1 are stored as one file, and all segments in a rep 2 are stored as one file. Correspondingly, in the storage manner shown in FIG. 5, the server may describe related information of each segment in the MPD of the bitstream by using an index segment (namely, "sidx" in FIG. 5). The index segment describes information such as a byte offset of each segment in a file in which the segment is stored, a size of each segment, and duration of each segment (duration, which is also referred to as duration of each segment).

Figure 7:
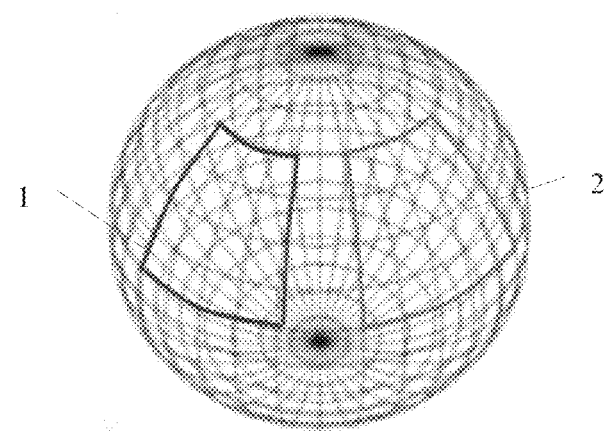
FIG. 7 is a schematic diagram of a viewport corresponding to a viewport change.
Figure 8:
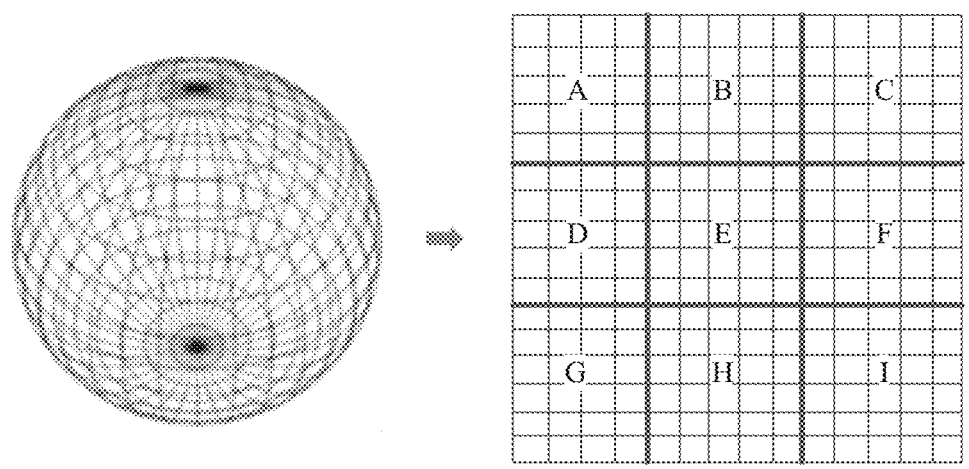
FIG. 8 is another schematic diagram of a spatial relationship between spatial objects.

Currently, with increasing popularity of applications for viewing a VR video such as a 360-degree video, increasing users participate in viewing a VR video with a large field of view. Although bringing a new video viewing mode and visual experience to the users, such a new video viewing application also imposes a new technical challenge. In a process of viewing the video with a large viewport such as a 360-degree viewport (the 360-degree viewport is used as an example for description in the embodiments of the present disclosure), a spatial region of the VR video is 360-degree panoramic space (or referred to as omnidirectional space), and exceeds a normal human-eye visual range. Therefore, when viewing the video, a user changes a viewport (namely, a field of view. FOV) at any time. A viewed video image varies with a viewport of the user, and therefore, content presented in the video needs to change with the viewport of the user. FIG. 7 is a schematic diagram of a viewport corresponding to a viewport change. A box 1 and a box 2 are respectively two different fields of view of the user. When viewing the video, the user may change the viewport for video viewing from the box 1 to the box 2 by performing operations such as eye or head rotation or picture switching of a video viewing device. When the viewport of the user is the box 1, a viewed video image is a video image presented at the moment by one or more spatial objects corresponding to the field of view. The viewport of the user is changed to the box 2 at a next moment. In this case, a video image viewed by the user also needs to be changed into a video image presented at this moment by a spatial object corresponding to the box 2.

In some feasible implementations, a client may obtain, by using an MPD, spatial information of a video bitstream prepared by a server for each spatial object, so that the client can request, from the server based on a viewport requirement, a video bitstream segment corresponding to one or more spatial objects in a time period, and output a corresponding spatial object based on the viewport requirement. When outputting, in a same time period, video bitstream segments corresponding to all spatial objects in a 360-degree viewport range, the client may output and display a complete video image in the time period in entire 360-degree panoramic space. When the client user changes the viewport for video viewing, the client may obtain, based on a new viewport selected by the user, a bitstream corresponding to a new spatial object, to present video content of the bitstream corresponding to the new spatial object to the new field of view. A video data processing method and an apparatus that are provided in the embodiments of the present disclosure are described below with reference to FIG. 9 to FIG. 15.

Figure 9:
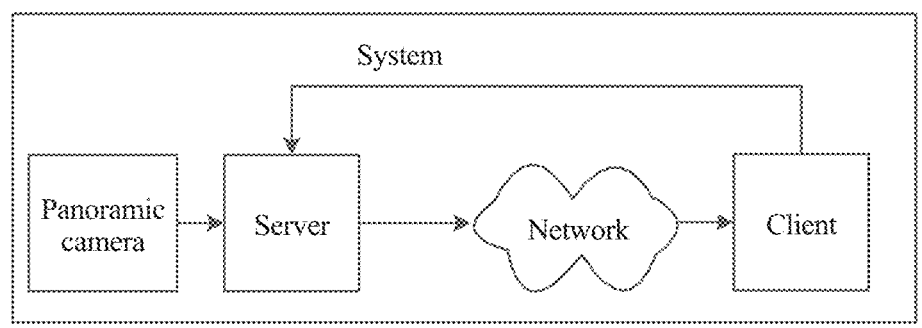
FIG. 9 is a schematic architectural diagram of a video data processing system according to an embodiment of the present disclosure.

FIG. 9 is a schematic architectural diagram of a video data processing system according to an embodiment of the present disclosure. A panoramic video data processing system provided in this embodiment of the present disclosure includes a panoramic camera, a server, and a client (or referred to as a terminal). The panoramic camera is configured to collect images or video data from 360 degrees, and may further splice the collected images into a panoramic image or splice the collected video data into a panoramic video. Image splicing or video data splicing may alternatively be processed by the server. This may be determined based on an actual application scenario requirement, and is not limited herein. The server is configured to perform an operation such as hierarchical coding and decoding or transcoding on the images or video data based on location information of a focus of a terminal user (namely, a viewport of the user). The server may be a media source server, a transmission server, a coding server, a transcoding server, or the like, may be on a network side, and may receive media data sent on the network side. The terminal may include an electronic device that may access a network, for example, VR glasses, a mobile phone, a tablet computer, a television, or a computer. The terminal receives, decodes, and displays data sent by the server, obtains FOV information of the user by using a sensor, and transmits the FOV information to an encoder (for example, the server).

Figure 10:
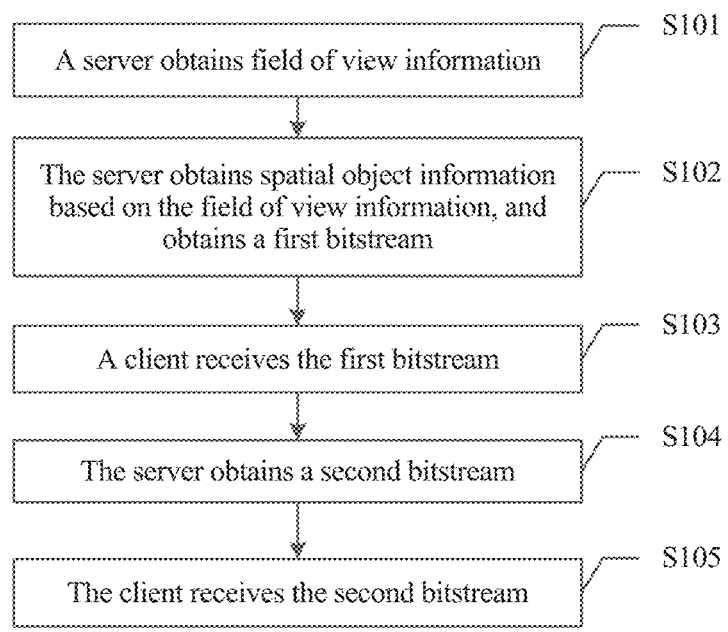
FIG. 10 is a schematic flowchart of a video data processing method according to an embodiment of the present disclosure.

FIG. 10 is a schematic flowchart of a video data processing method according to an embodiment of the present disclosure. The method provided in this embodiment of the present disclosure includes the following steps.

S101. A server obtains viewport information.

S102. The server obtains spatial object information based on the viewport information, and obtains a first bitstream.

Figure 11:
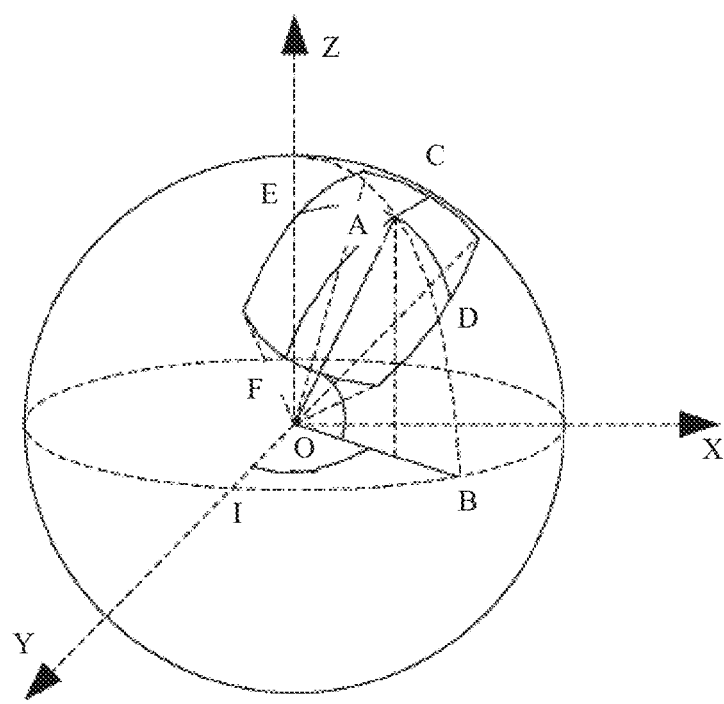
FIG. 11 is a schematic diagram of a location of a spatial object in panoramic space.

In some feasible implementations, the server may receive FOV information fed back by a client, and determine the viewport information for video data processing based on the FOV information fed back by the client. The viewport information is used to determine a viewport of a user at a current moment and a coding range in which video data coding needs to be performed. In other words, the viewport information is used to determine the spatial object information corresponding to the viewport information. The spatial object information is used to describe a specified spatial object in panoramic space. In specific implementation, the server may describe a location of the viewport of the user in the panoramic space at the current moment by using a latitude and longitude map or a yaw angle. By using the yaw angle as an example, the server may describe yaw angles of the FOV of the user in terms of a center location (center_pitch, center_yaw, and center_roll), a height (pitch_h), and a width yaw_w of a spherical surface by using center_pitch, center_yaw, center_roll, pitch_h, and yaw_w. FIG. 11 is a schematic diagram of a location of a spatial object in panoramic space. In FIG. 11, a point O is a center of sphere corresponding to a spherical image of a 360-degree VR panoramic video, and may be considered as a human-eye location when the VR panoramic image is viewed. A point A is a central point of a displayed image in the FOV of the user; C and F are boundary points in the displayed image that pass through the point A and that are along a lateral coordinate axis of the image; E and D are boundary points in the displayed image that pass through the point A and that are along a longitudinal coordinate axis of the displayed image; B is a projected point of the point A in the equator along a meridian of a spherical surface; and I is a start coordinate point of the equator in a horizontal direction. The elements are described as follows:

The center_pitch is a deflection angle in a vertical direction that is obtained by mapping a center location of an image of a spatial object corresponding to the FOV of the user at the current moment to a point of an image of the panoramic spherical surface (namely, the panoramic space), for example, ∠AOB in FIG. 1.

The center_yaw is a deflection angle in a horizontal direction that is obtained by mapping the center location of the image of the spatial object corresponding to the FOV of the user at the current moment to the point of the image of the panoramic spherical surface, for example, ∠IOB in FIG. 11.

The center_roll is a rotation angle between the center of sphere and the point, of the image of the panoramic spherical surface, that is mapped by the center location of the image of the spatial object corresponding to the FOV of the user at the current moment, for example, ∠DOB in FIG. 11.

The pitch_h is a viewport height of the image of the spatial object corresponding to the FOV of the user at the current moment in the image of the panoramic spherical surface, and is represented by using a maximum angle for the viewport in a vertical direction, for example, ∠DOE in FIG. 11. The yaw_w is a viewport width of the image of the spatial object corresponding to the FOV of the user at the current moment in the image of the panoramic spherical surface, and is represented by using a maximum angle for the viewport in a horizontal direction, for example, ∠COF in FIG. 11.

Alternatively, the center location may be directly represented by using a longitude and a latitude. This may be determined based on an actual application scenario requirement. An example in which the center location is represented by using the longitude and the latitude is used below for description.

The server may determine the viewport of the user at the current moment based on the viewport information in any one of the following four manners.

Manner 1:

The server receives location information that is of the FOV of the user at the current moment in the panoramic space and that is fed back by the client. The location of the FOV of the user at the current moment in the panoramic space may be set to an absolute location of the FOV of the user at the current moment in the 360-degree panoramic space, or an absolute location in a latitude and longitude map obtained by mapping the 360-degree panoramic image. The location information includes a center location, a start location, a left included angle and a right included angle of the center location, an upper included angle and a lower included angle of the center location, a length, a width, or the like. For example, a latitude and a longitude of the center location of the FOV of the user at the current moment are respectively 45 degrees and 90 degrees, and the length and the width of the FOV of the user at the current moment are respectively 30 (cm) and 30 (cm). The server may directly determine the FOV of the user at the current moment based on the location information fed back by the client. The left included angle of the center location may be an angle, centered by a center of a human-eye field of view, between the center of the human-eye viewport and an end point of the human-eye viewport in a left horizontal direction, or may be a left deflection angle in a horizontal direction in the foregoing yaw angles. The right included angle of the center location may be an angle, centered by a center of a human-eye field of view, between the center of the human-eye viewport and an end point of the human-eye viewport in a right horizontal direction, or may be a right deflection angle in a horizontal direction in the foregoing yaw angles. Likewise, the upper (lower) included angle of the center location may be an angle, centered by a center of a human-eye field of view, between the center of the human-eye viewport and an end point of the human-eye viewport in an upper (lower) vertical direction, or may be an upper (lower) deflection angle in a vertical direction in the foregoing yaw angles. This may be determined based on an actual application scenario, and details are not described below.

Manner 2:

The server receives location information that is of the FOV of the user at the current moment in the panoramic space and that is fed back by the client. The location of the FOV of the user at the current moment in the panoramic space may be set to a relative location of the FOV of the user at the current moment in the 360-degree panoramic space, namely, a difference from location information that is of the FOV of the user in the panoramic space and that is transmitted at a previous moment. The difference includes a difference between center locations, a difference between start locations, a difference between left or right included angles of the center locations, a difference between upper or lower included angles of the center locations, a difference between lengths, a difference between widths, and the like. For example, a difference between a longitude of the center location of the FOV of the user at the current moment and a longitude of the center location of the FOV of the user at the previous moment is 30 degrees, or a difference between a latitude of an upper left corner location of the FOV of the user at the current moment and a latitude of an upper left corner location of the FOV of the user at the previous moment is 15 degrees.

Manner 3:

The server receives location information that is of the FOV of the user at the current moment in the panoramic space and that is fed back by the client. The location information may be a center location, a start location, a left included angle and a right included angle of the center location, an upper included angle and a lower included angle of the center location, or the like. The server may determine the FOV of the user at the current moment based on the center location and a preset fixed length and width. Further, the server may determine the FOV of the user at the current moment based on the center location and a horizontal viewport and a vertical viewport of user eyes. For example, the server learns that the center location fed back by the client is at a longitude of 15 degrees and a latitude of 30 degrees, and may determine the FOV of the user at the current moment based on the horizontal viewport (for example, which is approximately 110 degrees and may reach 180 degrees in extremity) and the vertical viewport (for example, which is approximately 90 degrees) of the user eyes.

Manner 4:

The server receives a relative location or an absolute location that is of the FOV of the user at the current moment in the panoramic space and that is fed back by the client, and may further receive information fed back by the client, for example, a model of the client or a maximum resolution supported by the client. After receiving the relative location or the absolute location of the FOV of the user at the current moment in the panoramic space, the server may determine the FOV of the user at the current moment by using a corresponding method in the manner 1 to the manner 3. Further, when the determined FOV is less than the maximum resolution supported by the terminal, the server may directly use the determined FOV as the FOV of the user at the current moment. When the determined FOV is greater than the maximum resolution supported by the terminal, length and width information for the maximum resolution are used as a length and a width of the FOV of the user at the current moment.

In some feasible implementations, after determining the FOV of the user at the current moment, the server may further determine a coding spatial object (namely, the specified spatial object) in the panoramic space. In specific implementation, the server may determine the determined FOV of the user at the current moment as the coding spatial object, to encode an image included in the coding spatial object. A compression method such as H.264 or H.265 may be used for coding, and coding may be performed on a basis of frame. Alternatively, one frame may be divided into a plurality of small frames of a plurality of sub-regions for respective coding. A shape of a sub-region obtained by dividing each frame may be a square, a rectangle, or any irregular shape. In addition, shapes and sizes of all the sub-regions may be the same, or may be different. This may be determined based on an actual application scenario requirement.

Further, in some feasible implementations, after determining the FOV of the user at the current moment, the server may scale or extend the spatial object (namely, a target spatial object) corresponding to the FOV, and determine a spatial object obtained after the scaling and extending as the coding spatial object. The server may extend the target spatial object based on information such as the maximum resolution for image display that is supported by the client, and extend the target spatial object to a coding spatial object corresponding to the length and width information for the maximum resolution. Further, the server may alternatively extend the target spatial object based on a preset proportion set by the user, the client, or the server, to obtain the coding spatial object. For example, the server extends the target spatial object upward, downward, leftward, and rightward respectively by 100 pixels, or extends the target spatial object leftward and rightward respectively by M pixels, and extends the target spatial object upward and downward respectively by N pixels.

Further, the server may alternatively determine, based on a size of the target spatial object, an extension proportion for extending the target spatial object, to extend the target spatial object based on the determined extension proportion to obtain the coding spatial object. For example, the server may extend a length and a width of the target spatial object based on an extension proportion, namely, ⅓ of the length of the target spatial object and ⅓ of the width of the target spatial object, to obtain the coding spatial object. In this case, a length of the coding spatial object is 4/3 of the length of the target spatial object, and a width of the coding spatial object is 4/3 of the width of the target spatial object.

In some feasible implementations, after determining the coding spatial object (namely, the specified spatial object), the server may encode image data included in the coding spatial object, to obtain the first bitstream. In specific implementation, the server may encode the image data included in the coding spatial object in an existing coding manner, and transmit a coded bitstream to the client. The client may perform, based on an image data processing format supported by the client, adaptive decoding and play on the bitstream transmitted by the server. Further, the server may receive the image data processing format supported and fed back by the client, and the image data processing format may include an image data play format or an image data decoding capability. The server may determine the image data processing format supported by the client, and encode the image data included in the specified spatial object based on the determined image data processing format, to obtain the bitstream (namely, the first bitstream) having the image data processing format. The image data play format may include 2D image play, 3D image play, or the like. The image data decoding capability includes a quantity of processing cores of a processor, a dominant frequency of the processor, and the like. The image data decoding capability of the client also determines a bitstream format that can be decoded by the client, including a 2D bitstream, a 3D bitstream, and the like.

Further, in some feasible implementations, after determining the specified spatial object, the server may select, from one or more pieces of encoded image data that are pre-coded and that are stored in local storage space of the server, specified encoded image data corresponding to the specified spatial object to serve as the first bitstream. Each of the one or more pieces of encoded image data is corresponding to one spatial object in the panoramic space.

In some feasible implementations, after obtaining the first bitstream through encoding, the server may transmit the first bitstream to the client, so that the client performs decoding and play.

S103. A client receives the first bitstream.

In some feasible implementations, after receiving the first bitstream sent by the server, the client may decode the first bitstream to obtain the image data included in the specified spatial object. A decoding manner may include H.264, H.265, and the like. This is not limited herein.

S104. The server obtains a second bitstream.

In some feasible implementations, the server may obtain the second bitstream by downsampling an original 360-degree panoramic video as a 360-degree panoramic video with a relatively low resolution, mapping the 360-degree panoramic video with a low resolution to a latitude and longitude map with a low resolution, and encoding the latitude and longitude map with a low resolution. The first bitstream is a bitstream obtained by encoding image data corresponding to some spatial objects in the panoramic space, and the second bitstream is a bitstream obtained by encoding image data included in the panoramic space. Therefore, it may be learned that content of the second bitstream is greater than content of the first bitstream.

Alternatively, the server may obtain the second bitstream by mapping an original 360-degree panoramic video to a latitude and longitude map, downsampling the latitude and longitude map as a latitude and longitude map with a low resolution, and encoding the latitude and longitude map with a low resolution.

In specific implementation, a downsampling algorithm may include a nearest neighbor interpolation algorithm, a bilinear filter algorithm, a multi-tap filter algorithm, or the like. This is not limited herein. The nearest neighbor interpolation algorithm is used as an example below for description. A downsampling target resolution may be a fixed value, or may be determined based on the maximum resolution supported by the client. This may be determined based on an actual application scenario, and is not limited herein. For example, the server may obtain an image with a resolution of 2 k by downsampling each frame of panoramic image with a resolution of 8 k of the original 360-degree panoramic video. Therefore, image coding complexity and a bandwidth required for transmission may be significantly reduced.

Figure 12:
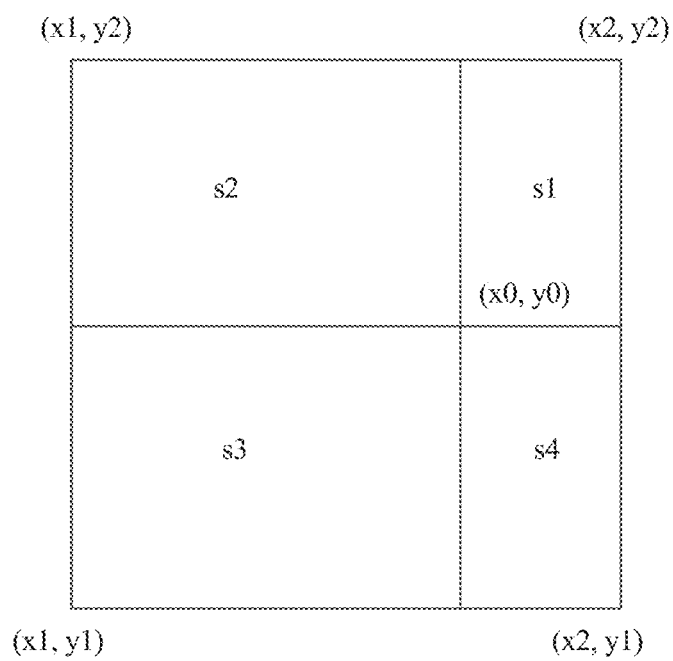
FIG. 12 is a schematic diagram of sampling description according to an embodiment of the present disclosure.

In the nearest neighbor interpolation algorithm, it is assumed that FIG. 12 is a schematic diagram of sampling description according to an embodiment of the present disclosure. As shown in the figure, a point (x, y) in a downsampling target image is a nearest point (x0, y0) in a source image of the panoramic video, the point (x, y) in the target image is corresponding to a point (x0', y0') in the source image, and x0' and y0' are possibly not integers but decimals. The nearest neighbor interpolation algorithm aims to find an integer value near (x0', y0') that is set to (int (x0'+0.5f), int (y0'+0.5f)). There is a need to find four points (x1, y2), (x2, y2), (x1, y1), and (x2, y1) near x0' and y0', and calculate a pixel value of the point (x, y) in the target image based on a distance relationship between each of the four points and (x0', y0'). The algorithm is described as follows:

value (x0, y0)=value (x2, y2)'s1+value (x1, y2)×s2+value (x1, y1)×s3+value (x2, y1)×s4, where s1, s2, s3, and s4 are weight ratios of the four points. A point closer to the target point (namely, (x0, y0)) has a larger weight, and a point further away from the target point has a smaller weight. For example, s1, s2, s3, and s4 may be respectively 4, 3, 1, and 2.

Further, the server may determine, based on a feedback of the client, the image data processing format supported by the client, and encode, based on the image data processing format, the sampled image data obtained after the downsampling, to obtain the second bitstream having the image data processing format. Further, the server may transmit the second bitstream to the client by using a network, and the network may include the Internet, a cellular network, Bluetooth, infrared, Wi-Fi, or the like. This may be determined based on an actual application scenario, and is not limited herein.

S105. The client receives the second bitstream.

In some feasible implementations, after receiving the second bitstream, the client may decode and play the second bitstream. In specific implementation, after decoding the first bitstream and the second bitstream, the client may superpose a decoded image (which is referred to as a local image for short below) included in the coding spatial object to the latitude and longitude map of the panoramic image (which is referred to as a sampled panoramic image for short below) obtained after the downsampling, convert the latitude and longitude map into a 2D planar image (which is not in a format of a latitude and longitude map), and finally display and play the image in a 3D manner. Alternatively, the client may first map the local image and the sampled panoramic image to spherical images, superpose the local image to the sampled panoramic image, and display and play a superposed image.

Optionally, in some feasible implementations, in addition to image superposition play, the server may process the local image and the sampled panoramic image by using another existing image combination technology, including image supplementary play, image sampling play, or the like. For example, the server may splice the local image and the sampled panoramic image into one frame of image based on the current location information of the FOV of the user.

In addition to the superposition manner described above, the server may select and play corresponding content based on changes of the FOV of the user at the current moment and the FOV of the user at the previous moment. Selecting the corresponding content is used as an example below for description, and manners such as mapping and superposition are the same as those in the foregoing implementation.

1. If the location of the FOV of the user at the current moment does not change, or the location of the FOV of the user at the current moment changes but does not fall beyond the coding spatial object, the server may directly play and display the local image, and does not need to superpose the local image and the sampled panoramic image.

2. If the spatial object corresponding to the FOV of the user at the current moment is greater than a high-resolution coding region range of the coding spatial object, image data is displayed in the following two manners:

In an a1 manner, the latitude and longitude map corresponding to the sampled panoramic image with a low resolution is sampled based on a resolution of the local image, content of the local image is first superposed, content of the sampled panoramic image is supplemented to a location other than the coding spatial object, and the content is mapped to a 2D planar image format that needs to be displayed, and is displayed and played in a 3D manner. Therefore, video image display quality can be ensured, and user experience of the client can be improved.

In a b1 manner, the latitude and longitude map corresponding to the sampled panoramic image with a low resolution is sampled based on a resolution of the local image, and is mapped, based on the spatial object corresponding to the current FOV of the user, to a 2D planar image format that needs to be displayed, and the image is displayed and played in a 3D manner. Therefore, it is easy to implement, and more applicable.

Alternatively, when the server has mapped the latitude and longitude map to the 2D planar image, the terminal may directly obtain the 2D planar image after performing decoding. In this case, the manners in (1) and (2) may be used for processing and superposition play, and there is no need to map the latitude and longitude map to the 2D planar image. This may be determined based on an actual application scenario, and is not limited herein.

In addition to display only, when displaying the image data, the client may further detect the FOV of the user at the current moment, and transmit the FOV information to the server. In specific implementation, when displaying the video image data, the client may further detect a location of a focus of the user (for example, the center location of the FOV) by using a sensor (for example, a camera, a gyroscope, a gravity sensor, and a level sensor), and determine a location of a viewing region (namely, the FOV) of the user at the current moment based on the human-eye viewport (for example, a horizontal viewport (which is approximately 110 degrees, and may reach 180 degrees in extremity), and a vertical viewport (which is approximately 90 degrees)). The client may send the FOV information to the server. In specific implementation, for a representation manner of the FOV information, refer to the foregoing description. Details are not described herein.

Further, in some feasible implementations, in addition to representing the FOV information in the spherical representation manner, the FOV information may also be location information of a 2D image. By using latitude and longitude map as an example, the FOV information may be represented in the following manners:

A. A start location and an end location are absolute locations in the latitude and longitude map. For example, the start location is at a point with a pixel coordinate 1000 in a vertical direction and a pixel coordinate 1000 in a horizontal direction, and the end location is at a point with a pixel coordinate 3000 in a vertical direction and a pixel coordinate 2000 in a horizontal direction.

B. The FOV information is a start location or a center location and a region size. For example, the start location is at a point with a pixel coordinate 1000 in a vertical direction and a pixel coordinate 1000 in a horizontal direction, and the region size is 2000×1000.

C. The FOV information is a difference from a start location of the FOV of the user at the previous moment, for example, a difference 100 from a pixel coordinate in a vertical direction, and a difference 100 from a pixel coordinate in a horizontal direction. A region size in this case and a region size of the FOV of the user at the previous moment may be the same or different. This may be determined based on an actual application scenario.

Implementations described in A to C are only some possible implementations. More description manners may be extended based on an actual application scenario. Details are not described herein.

Further, in some feasible implementations, when transmitting the first bitstream or the second bitstream to the client, the server may adaptively select a to-be-transmitted bitstream based on a network bandwidth status of the server. When a network bandwidth is large, the server may directly transmit both the first bitstream and the second bitstream to the client, so that the client adaptively selects a bitstream to decode and play. When a network bandwidth is relatively small, the server may choose to transmit the second bitstream or a part of the second bitstream to the client, so as to reduce a transmission bandwidth, and ensure user viewing region quality and video continuity. When a network bandwidth is relatively small, the server may choose to transmit a part of the second bitstream and a part of the first bitstream to the client, or the server may choose to transmit the second bitstream instead of the first bitstream, so as to reduce a transmission bandwidth, and ensure user viewing region quality and video continuity. Table 1 is a table of a correspondence between a network bandwidth and to-be-transmitted data.

TABLE 1

| Network bandwidth | To-be-transmitted data |
|---|---|
| 10 G | The entire sampled panoramic image (namely, the second bitstream) |
| 1 G | Image data that is in a region, in the sampled panoramic image, that is centered by an FOV region and that has an angle of 360 degrees in a horizontal direction and an angle of 360 degrees in a vertical direction (namely, a part of the second bitstream, which may be set to a bitstream corresponding to a spatial object with a size of second preset space) |

TABLE 1-continued

| Network bandwidth | To-be-transmitted data |
|---|---|
| 100M | Image data that is in a region, in the sampled panoramic image, that is centered by an FOV region and that has an angle of 180 degrees in a horizontal direction and an angle of 120 degrees in a vertical direction (namely, a part of the second bitstream, which may be set to a bitstream corresponding to a spatial object with a size of second preset space) |
| 10M | Only the local image (namely, the first bitstream) is transmitted, and the sampled panoramic image (namely, the second bitstream) is not transmitted. |

In specific implementation, Table 1 only lists some possible implementations instead of all implementations of the correspondence between a network bandwidth and to-be-transmitted data. This may be determined based on an actual application scenario, and is not limited herein.

In addition, when a network bandwidth is relatively small, the server may alternatively select latitude and longitude map data corresponding to partially transmitted local image, so as to reduce transmission bandwidth, and ensure video image quality and continuity in the view port of the user. Table 2 is another table of a correspondence between a network bandwidth and to-be-transmitted data.

TABLE 2

| Network bandwidth | To-be-transmitted data |
|---|---|
| 10 G | Latitude and longitude map data of the complete sampled panoramic image (the entire local image is also transmitted, in other words, both the first bitstream and the second bitstream are transmitted) |
| 1 G | Image data that is in a region, in the sampled panoramic image, that is centered by an FOV region and that has an angle of 360 degrees in a horizontal direction and an angle of 360 degrees in a vertical direction (the entire local image is also transmitted, in other words, both the second bitstream and a part of the second bitstream are transmitted) |
| 100M | Image data that is in a region, in the sampled panoramic image, that is centered by an FOV region and that has an angle of 180 degrees in a horizontal direction and an angle of 120 degrees in a vertical direction (the entire local image is transmitted, in other words, both the second bitstream and a part of the second bitstream are transmitted) |
| 10M | Only the local image is transmitted, and the sampled panoramic image is not transmitted (in other words, only the first bitstream is transmitted, and the second bitstream is not transmitted). |
| 1M | The local image is partially transmitted (for example, only the image data included in the spatial object (which may be set to a first preset spatial object) corresponding to the FOV of the user at the current moment is transmitted, image data included in an extended spatial object is not transmitted), and the sampled panoramic image (namely, the second bitstream) is not transmitted. |

In specific implementation, Table 2 only lists some possible implementations instead of all implementations of the correspondence between a network bandwidth and to-be-transmitted data. This may be determined based on an actual application scenario, and is not limited herein.

In some feasible implementations, the server may select to-be-transmitted image data based on a network status or a bandwidth size of the server, and the client may select, based on a decoding capability of the client and an image data processing format supported by the client, a corresponding bitstream to decode and play. The client may select, based on the decoding capability of the client, an appropriate bitstream to decode. The decoding capability may include a quantity of processing cores of a processor of the client, a dominant frequency of the processor, and the like. Table 3 is a table of a correspondence between the decoding capability of the client and the bitstream selected by the client to decode.

TABLE 3

| Decoding capability | To-be-decoded bitstream |
|---|---|
| With eight cores and a dominant frequency of 2.6 G | Second bitstream + first bitstream |
| With four cores and a dominant frequency of 2.4 G | Second bitstream + a part of the first bitstream |
| With two cores and a dominant frequency of 2 G | Second bitstream |

In specific implementation, the eight cores indicate that the processor of the client is an eight-core processor. Likewise, both the four cores and the two cores indicate the quantity of cores of the processor of the client. Only some feasible implementations are provided for the bitstream selected by the client to decode based on the decoding capability of the client. This may be determined based on an actual application scenario, and is not limited herein.

In addition, in some feasible implementations, the terminal may further determine, based on the decoding capability, to decode a 2D bitstream or a 3D bitstream. When the bandwidth is adequate, the server may encode bitstreams in two image data play format: 2D and 3D, and transmit the bitstreams to the client. The client may select a bitstream in a corresponding play format based on the decoding capability for decoding processing, and then display and play the bitstream. Table 4 is another table of a correspondence between the decoding capability of the client and a bitstream selected by the client to decode.

TABLE 4

| Decoding capability | To-be-decoded bitstream |
|---|---|
| With eight cores and a dominant frequency of 2.6 G | 3D second bitstream + 3D first bitstream |
| With four cores and a dominant frequency of 2.4 G | 2D second bitstream + 3D first bitstream |
| With two cores and a dominant frequency of 2 G | 2D second bitstream + a part of the 3D first bitstream |

In specific implementation, Table 4 only lists some examples instead of all examples of the decoding capability. Only some possible implementations instead of all possible implementations are provided for the correspondence between the decoding capability and the to-be-decoded bitstream. This may be determined based on an actual application scenario, and is not limited herein.

In some feasible implementations, after decoding the bitstream sent by the server, the client may further select, based on a video/image format (namely, the image data play format) supported by the client, an appropriate bitstream to display and play. In an example in which transmitted data in a latitude and longitude map format is encoded, if the image data play format supported by the client is a 2D play format, the client may map a decoded image to a 2D planar image for display and play after decoding a corresponding bitstream. If the image data play format supported by the client is a 3D play format, the client may map a decoded latitude and longitude map image to image data in a format such as a 3D spherical surface for display and play after decoding a corresponding bitstream. For example, if the client is VR glasses, and the play format supported by the client is a 3D format, the client may map decoded image data to image data in a 3D spherical format for display and play. If the client is a tablet computer, and the play format supported by the client is a 2D format, the client may map decoded image data to a 2D planar image for display and play. If the client supports both a 2D format and a 3D format for image data play and display, the client may play and display image data based on a default play format (one of 2D or 3D), or may play and display image data based on a play format selected by the user, or may display a part of image data in the 2D format and display the other part of image data in the 3D format, or the like. This is not limited herein.

Alternatively, in some feasible implementations, the client may send information such as the image data play format supported by the client and the image data decoding capability of the client to the server, and the server directly converts each frame of image into a corresponding format for encoding and transmission. After receiving the bitstream sent by the server, the client may directly decode and play the bitstream, and does not need to perform play format conversion and the like, so as to implement a simple operation, and achieve high applicability.

In some feasible implementations, the client may provide image data play modes based on the decoding capability of the client for user selection, to select, based on an image data play mode selected by the user, a target bitstream from the second bitstream and the second bitstream to decode, and play the target bitstream based on the corresponding play format. For example, the client may provide one or more image data play modes for user selection, and played image content, image quality, an image display format, and the like vary with an image data play mode. It is assumed that the client provides three image data play modes for user selection, played image content corresponding to a first mode is superposition of images obtained by decoding the first bitstream and the second bitstream, played image content corresponding to a second mode is an image obtained by decoding the first bitstream, played image content corresponding to a third mode is an image obtained by decoding the second bitstream, and the like. The client may play corresponding content based on an image data play mode selected by the user, and therefore video data processing flexibility and interestingness are improved.

Further, in a video play process, the client may mark a current image data play mode, and present the current image data play mode to the user. The user may determine, by using the foregoing mark, a play format of a video currently viewed by the user, so that the user selects an expected play mode at any time as required. The foregoing mark may be highlighting, hiding of another mode, or the like. This is not limited herein.

Figure 13:
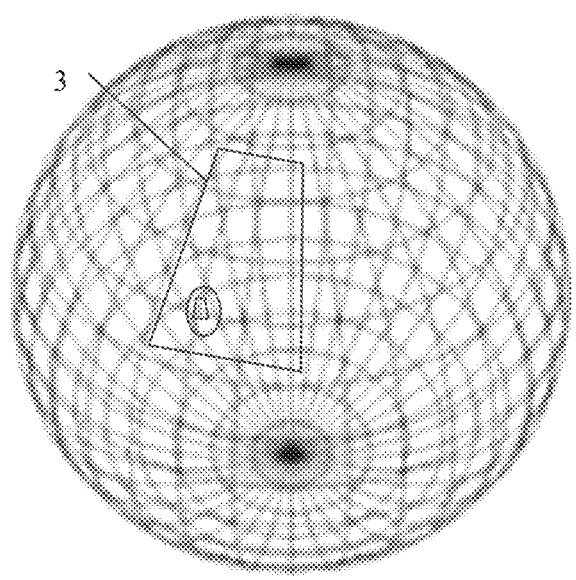
FIG. 13 is a schematic diagram of a relative location of a spatial object in panoramic space according to an embodiment of the present disclosure.

In some feasible implementations, in the video play process, the client may display, in the spatial object corresponding to the FOV of the user at the current moment, a relative location of the spatial object corresponding to the FOV of the user at the current moment in the panoramic space. The client may determine, based on the viewport information of the user at the current moment, the relative location of the spatial object corresponding to the viewport of the user at the current moment in the panoramic space, and display a schematic diagram of the relative location at a specified location of the spatial object corresponding to the viewport of the user at the current moment. The specified location includes an upper left corner, an upper right corner, a lower left corner, a lower right corner, and the like. FIG. 13 is a schematic diagram of a relative location of a spatial object in panoramic space according to an embodiment of the present disclosure. The client may display a relative location of a box 3 in the panoramic space (the spherical surface) at the current moment in a lower left corner of a spatial object (for example, the box 3) viewed by the user at the current moment, so as to facilitate user check, and improve user video viewing interestingness.

In this embodiment of the present disclosure, the server may determine the spatial object information based on the viewport information, may transmit, to the client, the bitstream obtained by encoding the image data included in the specified spatial object described by using the spatial object information, and may further transmit, to the client, the bitstream obtained by encoding the image data in the panoramic space, so that the client performs adaptive selection and play, thereby improving video data transmission applicability and video data selection diversity, and improving user video viewing experience. The server may further encode and partially transmit the image data based on the information such as the network status of the server and the image data processing format of the client, so as to implement a more flexible operation, and achieve higher applicability. The client may determine the bitstream play mode based on the viewport of the user at the current moment, and select a corresponding bitstream from a plurality of received bitstreams to play, so as to improve bitstream play selection diversity, improve video data processing flexibility, and improve user video viewing experience. The client may further select and play some bitstreams based on the information such as the network status of the client, the image data processing format, and the decoding format, so as to implement a more flexible operation.

Figure 14:
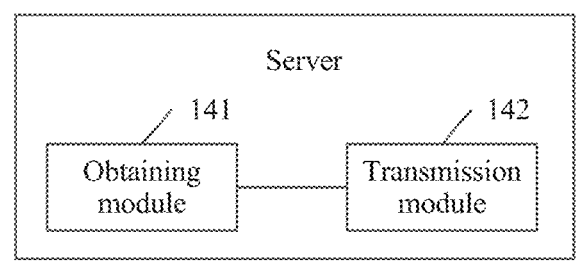
FIG. 14 is a schematic structural diagram of an embodiment of a server according to an embodiment of the present disclosure.

FIG. 14 is a schematic structural diagram of an embodiment of a server according to an embodiment of the present disclosure. The server provided in this embodiment of the present disclosure includes an obtaining module 141 and a transmission module 142.

The obtaining module 141 is configured to obtain viewport information.

The obtaining module 141 is further configured to obtain spatial object information based on the viewport information, and the spatial object information is used to describe a specified spatial object in panoramic space.

The obtaining module 141 is further configured to obtain a first bitstream, and the first bitstream is obtained by encoding image data in the specified spatial object.

The obtaining module 141 is further configured to obtain a second bitstream, and the second bitstream is obtained by encoding image data in the panoramic space.

The transmission module 142 is configured to transmit the first bitstream and the second bitstream that are obtained by the obtaining module to a client.

In a possible implementation in this embodiment of the present disclosure, the viewport information includes location information of a viewport of a user in the panoramic space; and the location information includes at least one of a center location, a start location, a left included angle and a right included angle of the center location, an upper included angle and a lower included angle of the center location, a length, and a width.

In a possible implementation in this embodiment of the present disclosure, the viewport information includes a difference between location information of a viewport of a user at a current moment in the panoramic space and location information of a viewport of the user at a previous moment in the panoramic space; and the location information includes at least one of a center location, a start location, a left included angle and a right included angle of the center location, an upper included angle and a lower included angle of the center location, a length, and a width.

In a possible implementation in this embodiment of the present disclosure, the viewport information further includes displayed resolution information.

In a possible implementation in this embodiment of the present disclosure, the specified spatial object is:

a spatial object corresponding to a viewport of a user at a current moment in the panoramic space; or a spatial object obtained by adjusting a spatial object corresponding to a viewport of a user at a current moment in the panoramic space.

In a possible implementation in this embodiment of the present disclosure, the spatial object corresponding to the viewport of the user at the current moment in the panoramic space is an initial spatial object, and the spatial object obtained by adjusting the spatial object corresponding to the viewport of the user at the current moment in the panoramic space includes:

a spatial object obtained by scaling or extending the initial spatial object based on a preset proportion; or a spatial object obtained by scaling or extending the initial spatial object based on an adjustment proportion, where the adjustment proportion is determined based on the initial spatial object; or a spatial object obtained by scaling or extending the initial spatial object based on an adjustment proportion fed back by the client.

In a possible implementation in this embodiment of the present disclosure, the transmission module 142 is configured to:

select, based on a network status of the server from the second bitstream obtained by the obtaining module, a bitstream corresponding to a preset spatial object, and transmit the first bitstream and the bitstream corresponding to the preset spatial object to the client.

In a possible implementation in this embodiment of the present disclosure, the transmission module 142 is configured to:

select, based on a network status of the server from the first bitstream obtained by the obtaining module, a bitstream corresponding to a preset spatial object, and transmit the second bitstream and the bitstream corresponding to the preset spatial object to the client.

In a possible implementation in this embodiment of the present disclosure, the transmission module 142 is configured to:

select, based on a network status of the server from the first bitstream obtained by the obtaining module, a bitstream corresponding to a first preset spatial object, and select, from the second bitstream obtained by the obtaining module, a bitstream corresponding to a second preset spatial object; and transmit the bitstream corresponding to the first preset spatial object and the bitstream corresponding to the second preset spatial object to the client.

In a possible implementation in this embodiment of the present disclosure, the obtaining module 141 is configured to:

obtain an image data processing format supported by the client; and encode, based on the image data processing format, the image data included in the specified spatial object, to obtain the first bitstream having the image data processing format, where the image data processing format includes at least one of an image data play format or an image data decoding format.

In a possible implementation in this embodiment of the present disclosure, the obtaining module 141 is configured to:

obtain an image data processing format supported by the client; and encode, based on the image data processing format, the image data included in the panoramic space, to obtain the second bitstream having the image data processing format, where the image data processing format includes at least one of an image data play format or an image data decoding format.

In a possible implementation in this embodiment of the present disclosure, the obtaining module 141 is configured to:

select, from at least one prestored encoded bitstream, a specified bitstream corresponding to the specified spatial object, to use the specified bitstream as the first bitstream, where each of the at least one encoded bitstream is corresponding to one spatial object in the panoramic space.

In specific implementation, the server provided in this embodiment of the present disclosure may perform implementations performed by the server in the video data processing method. For details, refer to the foregoing implementations. Details are not described herein.

Figure 15:
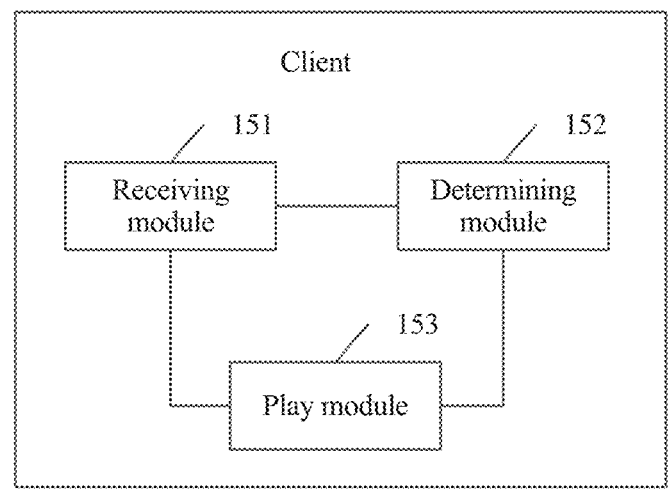
FIG. 15 is a schematic structural diagram of an embodiment of a client according to an embodiment of the present disclosure.
Figure 16:
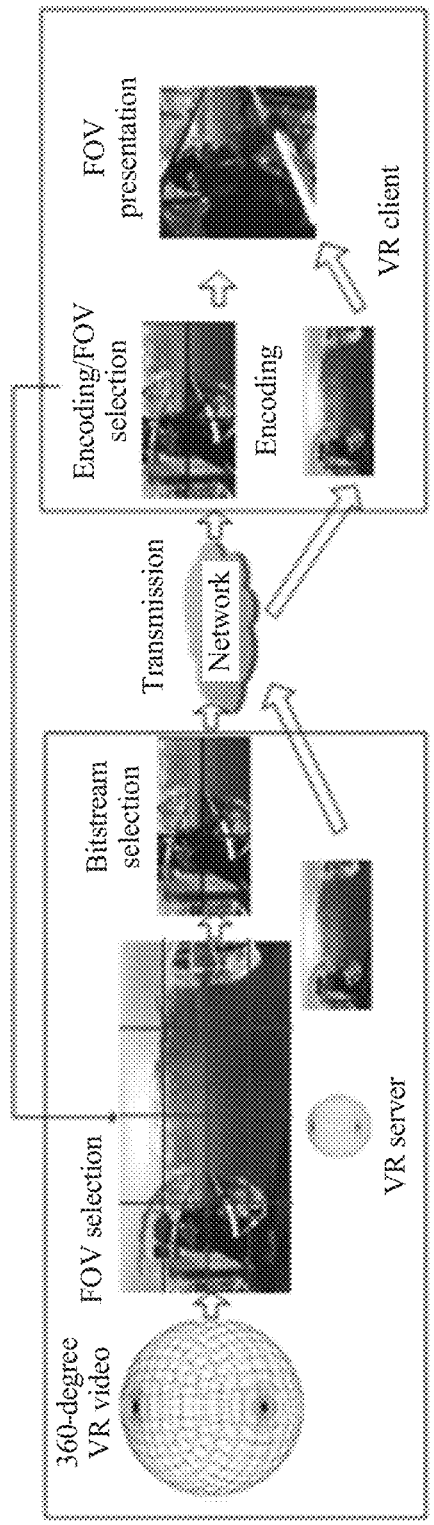
FIG. 16 is a schematic diagram of streaming media-based video data processing according to an embodiment of the present disclosure.
Figure 17:
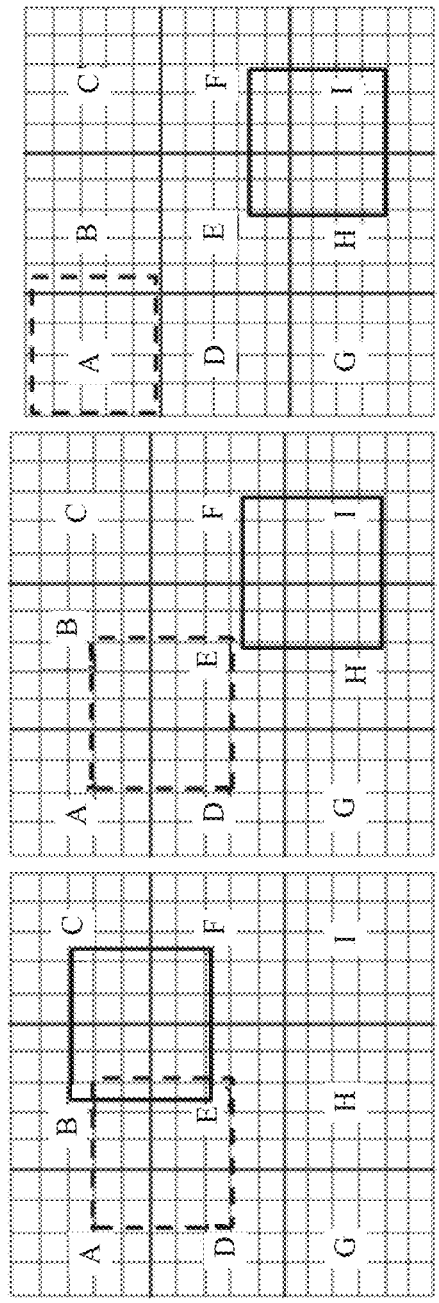
FIG. 17 is a schematic diagram of a spatial object change corresponding to a viewport change.

FIG. 15 is a schematic structural diagram of an embodiment of a client according to an embodiment of the present disclosure. The client provided in this embodiment of the present disclosure includes a receiving module 151, a determining module 152, and a play module 153.

The receiving module 151 is configured to receive a first bitstream. The first bitstream is obtained by encoding image data in a specified spatial object, and the specified spatial object is a spatial object in panoramic space.

The receiving module 151 is further configured to receive a second bitstream, and the second bitstream is obtained by encoding image data in the panoramic space.

The determining module 152 is configured to determine a bitstream play mode based on viewport information of a user at a current moment.

The play module 153 is configured to play, based on the bitstream play mode determined by the determining module, the second bitstream and the first bitstream that are received by the receiving module.

In a possible implementation in this embodiment of the present disclosure, the play mode includes at least one of superposition play, supplementary play, or sampling play.

In a possible implementation in this embodiment of the present disclosure, the viewport information includes location information of a viewport of the user in the panoramic space; and the location information includes at least one of a center location, a start location, a left included angle and a right included angle of the center location, an upper included angle and a lower included angle of the center location, a length, and a width.

In a possible implementation in this embodiment of the present disclosure, the viewport information includes a difference between location information of a viewport of the user at the current moment in the panoramic space and location information of a viewport of the user at a previous moment in the panoramic space; and the location information includes at least one of a center location, a start location, a left included angle and a right included angle of the center location, an upper included angle and a lower included angle of the center location, a length, and a width.

In a possible implementation in this embodiment of the present disclosure, the viewport information further includes displayed resolution information.

In a possible implementation in this embodiment of the present disclosure, the play mode is the superposition play; and the play module 153 is configured to:

decode the first bitstream and the second bitstream that are received by the receiving module, and perform superposition play on images of two decoded bitstreams.

In a possible implementation in this embodiment of the present disclosure, the play mode is the supplementary play; and the play module 153 is configured to:

decode the first bitstream and the second bitstream that are received by the receiving module, and supplement an image of a decoded second bitstream to an image of a decoded first bitstream for play.

In a possible implementation in this embodiment of the present disclosure, the play mode is the sampling play; and the play module 153 is configured to:

decode the second bitstream received by the receiving module, sample an image of a decoded second bitstream based on a resolution of an image corresponding to the first bitstream, to obtain a sampled image, and play the sampled image.

In a possible implementation in this embodiment of the present disclosure, the play module 153 is configured to:

decode the second bitstream and the first bitstream based on an image data processing format supported by the client, and play decoded images based on the play mode; or decode the second bitstream and a part of the first bitstream based on an image data processing format supported by the client, and play decoded images based on the play mode; or decode a part of the second bitstream and the first bitstream based on an image data processing format supported by the client, and play decoded images based on the play mode: or decode a part of the second bitstream and a part of the first bitstream based on an image data processing format supported by the client, and play decoded images based on the play mode, where the image data processing format includes at least one of an image data play format or an image data decoding format.

In a possible implementation in this embodiment of the present disclosure, the play module 153 is configured to:

select a target bitstream from the second bitstream and the first bitstream based on an image data play mode selected by the user, decode the target bitstream, and play a decoded image based on the play mode.

In a possible implementation in this embodiment of the present disclosure, the determining module 152 is further configured to:

determine, based on the viewport information of the user at the current moment, a spatial object corresponding to a viewport of the user at the current moment; and the play module 153 is further configured to:

display the image data play mode at a specified display location of the spatial object that is corresponding to the viewport and that is determined by the determining module.

In a possible implementation in this embodiment of the present disclosure, the determining module 152 is further configured to:

determine, based on the viewport information of the user at the current moment, a spatial object corresponding to a viewport of the user at the current moment, and determine a location, in the panoramic space, of the spatial object corresponding to the viewport of the user at the current moment; and the play module 153 is further configured to:

display a schematic diagram of the location at a specified display location of the spatial object that is corresponding to the viewport of the user at the current moment and that is determined by the determining module.

In specific implementation, the client provided in this embodiment of the present disclosure may perform implementations performed by the client in the video data processing method. For details, refer to the foregoing implementations. Details are not described herein.

In the embodiments of the present disclosure, the server may determine the spatial object information based on the viewport information, may transmit, to the client, the bitstream obtained by encoding the image data included in the specified spatial object described by using the spatial object information, and may further transmit, to the client, the bitstream obtained by encoding the image data in the panoramic space, so that the client performs adaptive selection and play, thereby improving video data transmission applicability and video data selection diversity, and improving user video viewing experience. The server may further encode and partially transmit the image data based on the information such as the network status of the server and the image data processing format of the client, so as to implement a more flexible operation, and achieve higher applicability. The client may determine the bitstream play mode based on the viewport of the user at the current moment, and select a corresponding bitstream from a plurality of received bitstreams to play, so as to improve bitstream play selection diversity, improve video data processing flexibility, and improve user video viewing experience. The client may further select and play some bitstreams based on the information such as the network status of the client, the image data processing format, and the decoding format, so as to implement a more flexible operation.

In the specification, claims, and accompanying drawings of the present disclosure, the terms "first", "second", "third", "fourth", and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include: a magnetic disc, an optical disc, a read-only memory (ROM), or a random access memory (RAM).

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A video data processing method, wherein the method comprises:
   receiving, by a client, a first bitstream, wherein the first bitstream is obtained by encoding image data in a specified spatial object, wherein the specified spatial object is part of panoramic space, wherein a size of the specified spatial object is larger than a size of a spatial object of the panoramic space corresponding to viewport information, and wherein the spatial object corresponding to the viewport information is located in the specified spatial object;
   receiving, by the client, a second bitstream, wherein the second bitstream is obtained by encoding image data of a panoramic image of the panoramic space with a lower resolution than a resolution of the image data included in the specified spatial object;
   determining, by the client, a bitstream play mode; and
   playing, by the client, the second bitstream and the first bitstream based on the bitstream play mode.

2. The method according to claim 1, wherein the play mode comprises at least one of superposition play, supplementary play, or sampling play.

3. The method according to claim 1, wherein the viewport information comprises location information of a viewport of a user in the panoramic space; and
   wherein the location information comprises at least one of a center location, a start location, a left included angle and a right included angle of the center location, an upper included angle and a lower included angle of the center location, a length, or a width.

4. The method according to claim 1, wherein the viewport information comprises a difference between location information of a viewport of a user at a current moment in the panoramic space and location information of a viewport of the user at a previous moment in the panoramic space; and
   wherein the location information comprises at least one of a center location, a start location, a left included angle and a right included angle of the center location, an upper included angle and a lower included angle of the center location, a length, or a width.

5. The method according to claim 3, wherein the viewport information further comprises displayed resolution information.

6. The method according to claim 2, wherein the play mode is the superposition play; and
   wherein the playing, by the client, the second bitstream and the first bitstream based on the bitstream play mode comprises:
      decoding, by the client, the first bitstream and the second bitstream; and
      performing superposition play on images of two decoded bitstreams.

7. The method according to claim 2, wherein the play mode is the supplementary play; and
   wherein the playing, by the client, the second bitstream and the first bitstream based on the bitstream play mode comprises:
      decoding, by the client, the first bitstream and the second bitstream; and
      supplementing an image of a decoded second bitstream to an image of a decoded first bitstream for play.

8. The method according to claim 2, wherein the play mode is the sampling play; and
   wherein the playing, by the client, the second bitstream and the first bitstream based on the bitstream play mode comprises:
      decoding, by the client, the second bitstream;
      sampling an image of a decoded second bitstream based on a resolution of an image corresponding to the first bitstream to obtain a sampled image; and
      playing the sampled image.

9. The method according to claim 1, wherein the playing, by the client, the second bitstream and the first bitstream based on the bitstream play mode comprises:
   decoding, by the client, the second bitstream and the first bitstream based on an image data processing format supported by the client, and playing decoded images based on the play mode; or
   decoding, by the client, the second bitstream and a part of the first bitstream based on an image data processing format supported by the client, and playing decoded images based on the play mode; or
   decoding, by the client, a part of the second bitstream and the first bitstream based on an image data processing format supported by the client, and playing decoded images based on the play mode; or
   decoding, by the client, a part of the second bitstream and a part of the first bitstream based on an image data processing format supported by the client, and playing decoded images based on the play mode,
   wherein the image data processing format comprises at least one of an image data play format or an image data decoding format.

10. The method according to claim 1, wherein the playing, by the client, the second bitstream and the first bitstream based on the bitstream play mode comprises:
    selecting, by the client, a target bitstream from the second bitstream and the first bitstream based on an image data play mode selected by a user;
    decoding the target bitstream; and
    playing a decoded image based on the play mode.

11. The method according to claim 10, wherein the method further comprises:
    determining, based on the viewport information of the user at a current moment, a spatial object corresponding to a viewport of the user at the current moment; and
    displaying the image data play mode at a specified display location of the spatial object corresponding to the viewport.

12. The method according to claim 10, wherein the method further comprises:
    determining, based on the viewport information of the user at a current moment, a spatial object corresponding to a viewport of the user at the current moment;
    determining a location, in the panoramic space, of the spatial object corresponding to the viewport of the user at the current moment; and
    displaying a schematic diagram of the location at a specified display location of the spatial object corresponding to the viewport of the user at the current moment.

13. A client device, comprising:
    a receiver, at least one processor, and a memory;
    wherein the memory is configured to store a set of program codes;
    wherein the set of program codes stored in the memory, when executed by the at least one processor, cause the client device to perform operations comprising:
       receiving, by the receiver, a first bitstream, wherein the first bitstream is obtained by encoding image data in a specified spatial object, wherein the specified spatial object is a part of panoramic space, wherein a size of the specified spatial object is larger than a size of a spatial object of the panoramic space corresponding to viewport information, and wherein the spatial object corresponding to the viewport information is located in the specified spatial object;

receiving, by the receiver, a second bitstream, wherein the second bitstream is obtained by encoding image data of a panoramic image of panoramic space with a lower resolution than a resolution of the image data included in the specified spatial object;

determining a bitstream play mode; and playing, based on the bitstream play mode, the second bitstream and the first bitstream.

14. The client device according to claim 13, wherein the play mode comprises at least one of superposition play, supplementary play, or sampling play.

15. The client device according to claim 13, wherein the viewport information comprises location information of a viewport of a user in the panoramic space; and wherein the location information comprises at least one of a center location, a start location, a left included angle and a right included angle of the center location, an upper included angle and a lower included angle of the center location, a length, or a width.

16. The client device according to claim 13, wherein the viewport information comprises a difference between location information of a viewport of a user at a current moment in the panoramic space and location information of a viewport of the user at a previous moment in the panoramic space; and wherein the location information comprises at least one of a center location, a start location, a left included angle and a right included angle of the center location, an upper included angle and a lower included angle of the center location, a length, or a width.

17. The client device according to claim 15, wherein the viewport information further comprises displayed resolution information.

18. The client device according to claim 14, wherein the play mode is the superposition play; and wherein the operations further comprise:
decoding the first bitstream and the second bitstream that are received by the receiver; and
performing superposition play on images of two decoded bitstreams.

19. The client device according to claim 14, wherein the play mode is the supplementary play; and wherein the operations further comprise:
decoding the first bitstream and the second bitstream that are received by the receiver; and
supplementing an image of a decoded second bitstream to an image of a decoded first bitstream for play.

20. The client device according to claim 14, wherein the play mode is the sampling play; and wherein the operations further comprise:
decoding the second bitstream received by the receiver;
sampling an image of a decoded second bitstream based on a resolution of an image corresponding to the first bitstream to obtain a sampled image, and
playing the sampled image.

21. The client device according to claim 13, wherein the operations further comprise:
decoding the second bitstream and the first bitstream based on an image data processing format supported by the client, and playing decoded images based on the play mode; or
decoding the second bitstream and a part of the first bitstream based on an image data processing format supported by the client, and playing decoded images based on the play mode; or
decoding a part of the second bitstream and the first bitstream based on an image data processing format supported by the client, and playing decoded images based on the play mode; or
decoding a part of the second bitstream and a part of the first bitstream based on an image data processing format supported by the client, and playing decoded images based on the play mode,
wherein the image data processing format comprises at least one of an image data play format or an image data decoding format.

22. The client device according to claim 13, wherein the operations further comprise:
selecting a target bitstream from the second bitstream and the first bitstream based on an image data play mode selected by a user;
decoding the target bitstream; and
playing a decoded image based on the play mode.

23. The client device according to claim 22, wherein the operations further comprise:
determine, based on the viewport information of the user at a current moment, a spatial object corresponding to a viewport of the user at the current moment; and
displaying the image data play mode at a specified display location of the spatial object that is corresponding to the viewport.

24. The client device according to claim 22, wherein the operations further comprise:
determining, based on the viewport information of the user at a current moment, a spatial object corresponding to a viewport of the user at the current moment;
determining a location, in the panoramic space, of the spatial object corresponding to the viewport of the user at the current moment; and
displaying a schematic diagram of the location at a specified display location of the spatial object that is corresponding to the viewport of the user at the current moment.

* * * * *